(12) United States Patent
Ross et al.

(10) Patent No.: US 7,333,987 B2
(45) Date of Patent: *Feb. 19, 2008

(54) CONTROLLED-ACCESS DATABASE SYSTEM AND METHOD

(75) Inventors: David Justin Ross, Redmond, WA (US); Jack Love, Bellevue, WA (US); Stephen E. M. Billester, Redmond, WA (US); Brent R. Smith, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 416 days.

This patent is subject to a terminal disclaimer.

(21) Appl. No.: 10/674,580

(22) Filed: Sep. 29, 2003

(65) Prior Publication Data

US 2004/0064454 A1   Apr. 1, 2004

Related U.S. Application Data

(63) Continuation of application No. 09/608,806, filed on Jun. 30, 2000, now Pat. No. 6,643,648.

(60) Provisional application No. 60/141,765, filed on Jun. 30, 1999.

(51) Int. Cl.
G06F 17/30 (2006.01)
G06F 15/16 (2006.01)

(52) U.S. Cl. .............................. 707/9; 707/8; 709/217; 713/165

(58) Field of Classification Search ..................... None
See application file for complete search history.

(56) References Cited

U.S. PATENT DOCUMENTS 4,827,508 A    5/1989    Shear 5,787,175 A    7/1998    Carter (Continued)

FOREIGN PATENT DOCUMENTS

EP    0991005 A2    4/2000

(Continued)

OTHER PUBLICATIONS

Ramez Elmasri and Shamkant Navathe, "Fundamentals of Database Systems," abstract and table of contents published on Internet site http://www.aw.com/catalog/academic/product/1,4096,0201741539,00.html., book published by Addison Wesley, 2002.

(Continued)

*Primary Examiner*—Tony Mahmoudi
(74) *Attorney, Agent, or Firm*—Stolowitz Ford Cowger LLP

(57) ABSTRACT

A controlled database system is designed for rapid access of data records with reduced memory storage requirements. The database system employs a set of obfuscated data records stored in data crystals that can only be accessed and read by an iterator, which is not directly accessible by the users of the database. The iterator accesses information responsive to a predefined query sent from a customer application. Rather than providing general tools to customers for constructing any possible queries, such as is done in structured query language database systems, database systems embodying the present invention allow only predefined types of queries to be used by customer applications. By restricting the types of queries customer applications can call, valuable data records remain secure from unauthorized reconstruction or duplication while still allowing limited access for specific purposes.

25 Claims, 19 Drawing Sheets

U.S. PATENT DOCUMENTS

| | | |
|---|---|---|
| 5,826,268 A | 10/1998 | Schaefer et al. |
| 5,857,193 A | 1/1999 | Sutcliffe et al. |
| 5,870,543 A | 2/1999 | Ronning |
| 5,889,860 A | 3/1999 | Eller et al. |
| 5,910,988 A | 6/1999 | Ballard |
| 5,963,642 A | 10/1999 | Goldstein |
| 6,032,137 A | 2/2000 | Ballard |
| 6,098,056 A | 8/2000 | Rusnak et al. |
| 6,128,611 A | 10/2000 | Doan et al. |
| 6,314,409 B2 * | 11/2001 | Schneck et al. ............... 705/54 |
| 6,442,549 B1 | 8/2002 | Schneider |
| 6,529,504 B1 | 3/2003 | Sbisa |
| 6,643,648 B1 * | 11/2003 | Ross et al. ...................... 707/9 |
| 6,760,843 B1 * | 7/2004 | Carter ........................ 726/10 |
| 2002/0007461 A1 * | 1/2002 | Garrison .................... 713/202 |
| 2005/0204348 A1 * | 9/2005 | Horning et al. ............. 717/140 |

OTHER PUBLICATIONS

Joe Celko, "Database Insecurity," DBMS, Jun. 1997. Internet site: http://www.dbmsmag.com/9706d06.html.

* cited by examiner

Exclusive-OR (XOR) Operations 1100 1110 0111 0011 —60
1011 0101 1010 1101 —62
- - - - - - - - - - - -
0111 1011 1101 1110 —64
1011 0101 1010 1101 —62
- - - - - - - - - - - -
1100 1110 0111 0011 —60

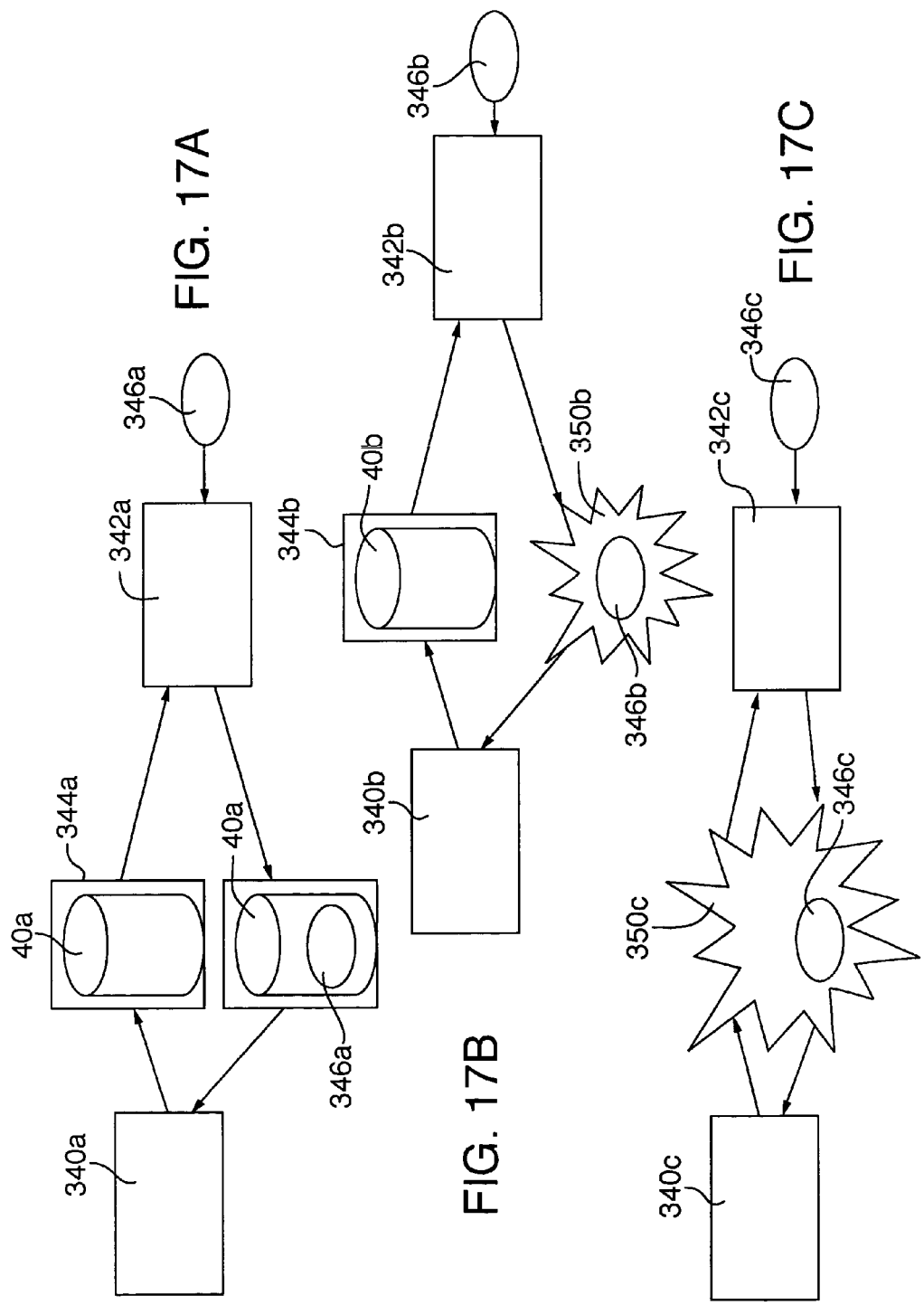

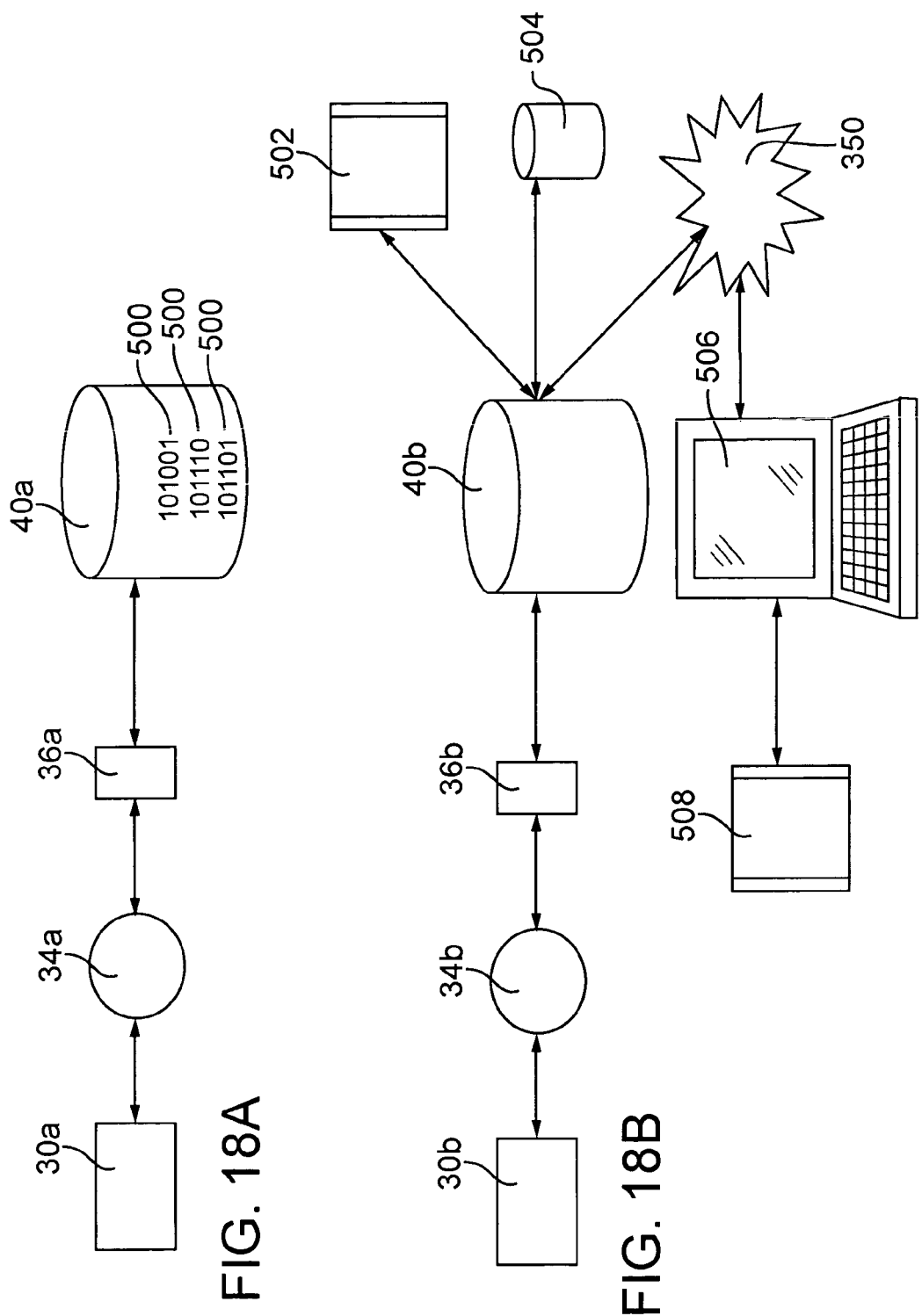

CONTROLLED-ACCESS DATABASE SYSTEM AND METHOD

RELATED APPLICATIONS

This application is a continuation of U.S. Nonprovisional Patent Application No. 09/608,806, filed Jun. 30, 2000, now U.S. Pat. No. 6,643,648 which claims the benefit of U.S. Provisional Patent Application No. 60/141,765, filed Jun. 30, 1999, both of which are hereby incorporated by reference in their entirety.

TECHNICAL FIELD

The present invention relates to the field of controlled-access database systems for securely maintaining data records in an otherwise unsecure location.

BACKGROUND OF THE INVENTION

Traditional databases have historically been used as a convenient tool for organizing large amounts of data in a structured and easily searchable format. Unfortunately, in order to provide this level of convenience, traditional databases are structured in such a way that their utility is considerably limited in several applications, especially those requiring fast access time and protection of highly valuable data when the database is copied to a new location. For example, applications such as those involved in the field of automated data capture and perfection frequently compare data contained in an input stream to reference data contained in a database. Often the reference data contained in the database has been accumulated at great expense, representing an extremely valuable resource to the developer of the database. To capitalize on this value, the developer must protect the information in the database from being copied or extracted.

Unfortunately, modern automated data capture and perfection systems, such as those used in mail-sorting operations, typically handle input streams with items passing at a rate of between ten and twenty per second. In order to provide convenience and flexibility and to allow the user to access data records at the desired rate, traditional databases have made the data available in a clear text form searchable with a general query language. As used throughout this specification, the term "general query language," or the like, refers to query language of a general nature, such as the industry standard structured query language (SQL). These traditional databases can be very large, requiring vast amounts of memory for storage. Also, in order to allow query language of a general, user-definable nature, traditional databases are heavily indexed, often with each data record referencing or pointing to multiple other data records. This also makes the database much larger and requires more memory, with the result being slower access time.

FIG. 1 shows a traditional database system typical of the prior art. With reference to FIG. 1, a customer-defined query 10 is entered into a general query language module 12. The general query language module 12, which supports general query language, interacts with the database server 14. The database server 14 can also interact with a transaction module and locking module 16 or a metadata table 15. The metadata table 15 is typically a catalogue of database contents. The database server 14 then accesses the database 18 and any of several data tables 19 potentially within the database 18. In a traditional database system, the database 18 typically stores data in a clear text format. Because a traditional database 18 has to support a wide variety of possible queries that can be constructed by the database customer using the general query language module 12, the traditional database 18 usually requires dedicating large amounts of memory to data structure storage and indexing to support general queries. Also, the ability of the customer to create a customer-defined query 10 requires enabling multiple searches and makes the overall database 18 insecure when installed at the database customer's site by allowing the customer to use a customer-defined query 10 to extract data methodically from the database 18.

Having a traditional database that is in clear text or that allows general query language provides a greater source of concern for the developer of the database when the database is distributed or copied beyond the site at which it was developed. Enabling general queries and storing the data records in clear text allow a user of the database to extract or copy the data from the database. Once the data has been extracted, the value of the original database is minimal. Traditional technological attempts to remedy this problem, such as through using data encryption, have typically been unsuccessful for database developers because the data records must be decrypted before they can be accessed, thus reducing the access time of the records too significantly for many high-speed database applications. Once the data is decrypted, the user can still use general queries or other methods to extract the data. Accordingly, an operable traditional database is typically only secure at the site of its creation. When created, a traditional database can be encrypted or stored securely; it can even be encrypted for transport to a customer. However, once a traditional database is provided to a customer in an operational form, the customer can either copy the entire database or use general query language to extract the valuable data.

There are numerous additional problems with traditional databases. For example, once a database has been given to a user, it is often difficult to repossess or restrict future access to the database once the term of use has expired. Another problem with traditional databases is that they require persistent efforts to keep the database records current. Mass updates of new records or changes in data structure can be time consuming and difficult to incorporate into an existing database because of the elaborate indexing system and interconnectedness of the various existing data records. Significant system downtime is typically required to update the data records. Even more downtime is required to install the updated database for the user and to make sure that all of the user's applications function with the updated database. Such downtime can be very costly to all parties involved.

Finally, the inability of traditional databases to allow the use of customized indexing methods limits their usefulness for applications requiring fast access for verifying input stream data with a high degree of uncertainty or distortion. Most traditional databases are indexed for doing exact matching of data fields as much as possible. More complex databases can use wildcards, such as an asterisk, to do leading-edge matching as well. For example, a user can query the database to search for the word "database" and an exact search will bring back the data record for "database." In a leading-edge search, the user can query the database to search for "dat*" and the database will supply results including "data," "database," "datum," etc. However, if the user were to query the database to search for the word "*bas*," a traditional database would have to search every record in the data table or index to supply any results that contain the search string "bas." That procedure would make a traditional database with a standard indexing structure too slow to be useful for many high-speed database applications. The present invention solves all of these problems associated with the use of traditional databases in a simple and efficient manner.

SUMMARY OF THE INVENTION

Embodiments of the present invention relate to a limited-access modular database designed to regulate access to the data records within the database while affording rapid data access rates and reduced requirements for data storage memory. The database design allows for efficient incorporation of high volumes of updated data records, and affords database designers a convenient method for obtaining updated information from an input stream with which the database is being used.

In accordance with the present invention, data is first obtained and stored within a clear text database. The data within the clear text database is then restructured, reorganized, and incorporated into a crystallized database. Throughout this specification and the attached claims, the term "crystal" or "crystallized" is used to connote the structured and compact nature of the data records in the database. The crystallized database may include one or more data crystals. Similarly, each data crystal can contain a plurality of data records, which, in turn, can be stored in multiple data tables. Data records within an individual data crystal can be linked to various other data crystals via pointers or indices. Once created, the data crystals, including the data records within the data crystals, are obfuscated. As used in this specification and the attached claims, the terms "obfuscated," "obfuscation," or the like are used generally to refer to one of several methods known in the computer programming art for inhibiting the potential for data to be accessed as clear text or in an unadulterated manner. Examples of obfuscation include simple compression, encryption, exclusive OR calculations, and similar alterations to the data. By compressing data records in the data crystals, the database requires much less storage memory than traditional databases, but it still remains rapidly accessible as required for use with many application programs.

Consistent with the present invention, iterators are created for accessing data records within the data crystals, typically in response to one or more queries of a predefined type. The predefined query types do not include general queries such as those available with general query language applications. As used throughout this specification and the attached claims, "iterator" refers to code containing instructions on how to locate, access, extract, or reconstruct the data records, including conducting any necessary obfuscation or de-obfuscation measures. Because of the additional capabilities of iterators, as described herein, the term "iterator" is defined to encompass more than is encompassed by use of that same term in the context of a Standard Template Library as used in computer programming. Database customer applications call queries belonging to the predefined query types to instruct the iterator to access the data records in the database. The database customer can be given access to select predefined query types, and the calling of the queries can be done by the customer application itself as part of standard operations. Database customer applications are only allowed to interact with queries. They cannot interact directly with the iterators. This prevents a customer from using the iterators to extract the entire contents of the crystalized database. The predefined query types are typically designed by the database designer to answer specific questions or to solve specific types of problems the database designer anticipates the customer to have. The complexity of the method used by the predefined query types to answer a particular question depends on the complexity of the question being asked or problem being solved. For example, a query can have multiple procedures for procuring information, and the actual procedures implemented can be responsive to the exact information needed. However, because the database designer does not have to structure the database to support customer-definable general queries, the database does not require the vast amounts of memory resources traditional databases commonly require for supporting numerous indexing and pointer structures. The database structure can be determined by the types of queries the customer application will be calling. Because the database only has to support limited types of queries, databases made in accordance with the present invention typically have a more compact data structure than traditional databases, resulting in improved access speed and storage memory requirements.

In a preferred embodiment, the iterator is preprogrammed code that is accessed by the queries and is designed to obfuscate or de-obfuscate data records in the data crystal in order to write or read a data record. In this embodiment, a database customer only has access to use the data in the database but does not have access either directly to view or to copy the data itself. The division of the crystal database into discrete data crystals also facilitates easy updating of the database. Access to new data crystals can be granted, and modified iterators or query types can be added as needed without taking the entire system offline for prolonged periods of time.

Several additional features can be added to the crystal database system to afford greater security. Keys can be implemented in either hardware or software to restrict use of the database to a particular customer or site. Similarly, the database designer can provide the customer with a database containing several different data crystals but only provide a key to access a limited number of the data crystals or a limited number of the predefined queries. Should the database designer wish to provide the customer with access to additional crystals or predefined queries, a new key could be provided to permit the customer the additional access without having to supply an entire new database. Additionally, because the user only has limited and specifically authorized access to the database, by incorporating an expiration date into the key or crystals, the database designer can effectively repossess the database from the user by restricting future access to the data.

An embodiment of this invention also provides convenient methods for both obtaining new data and updating data already in the database. For a database customer who is exposed to a large or continuous input stream of data onsite, the application calling queries of the predefined types can also store new data to a predetermined_storage location. Examples of the predetermined storage location include another data crystal, an appendix to an existing data crystal, a clear text file or spreadsheet, another database, or an external site, such as the database designer's Internet Web site, accessible via a network. The newly gathered information can then be collected by the database designer for addition to the original database and incorporation in future data crystals. The new information also can be analyzed for statistical significance before being added to the original database. Statistical analysis prevents an erred version of a current data record from being added to the database as a new data record, and it can also use several flawed examples to reconstruct the correct version of a data record for inclusion into the database.

Certain aspects of the limited-access database can also incorporate functionality of networks such as LANs, WANs, wireless networks, or the Internet. Data storage and access, authorization key access, or the accumulation of new data can each occur through network links to sites external to the system operating the database. For example, rather than containing data, a data record in a crystal database can contain a URL or hyperlink to retrieve data from a third party Web site.

Additional objects, aspects, and advantages of this invention will be apparent from the following detailed description of preferred embodiments thereof which proceeds with reference to the accompanying drawings.

BRIEF DESCRIPTION OF THE DRAWINGS

FIG. 3 also illustrates the use of three different security key mechanisms.

FIG. 4 depicts one example of a simplified XOR operation that can be used in obfuscating data in the data crystals of FIG. 2.

FIGS. 17A-17C depict three methods for transferring data collected at the customer site to the database designer for inclusion in the crystal database.

FIG. 18A depicts a communication chain typical of an embodiment of the present invention, wherein the data is stored internal to the crystal database.

FIG. 18B depicts a communication chain typical of an embodiment of the present invention, wherein the data is stored external to the crystal database.

DETAILED DESCRIPTION OF PREFERRED EMBODIMENTS

Although embodiments of this invention can be used for various purposes, preferred embodiments involve use of the invention in automated data capture and perfection systems. However, this invention should not be limited to use in such context, as other uses or embodiments equally fall within the scope of the present invention.

Figure 1:
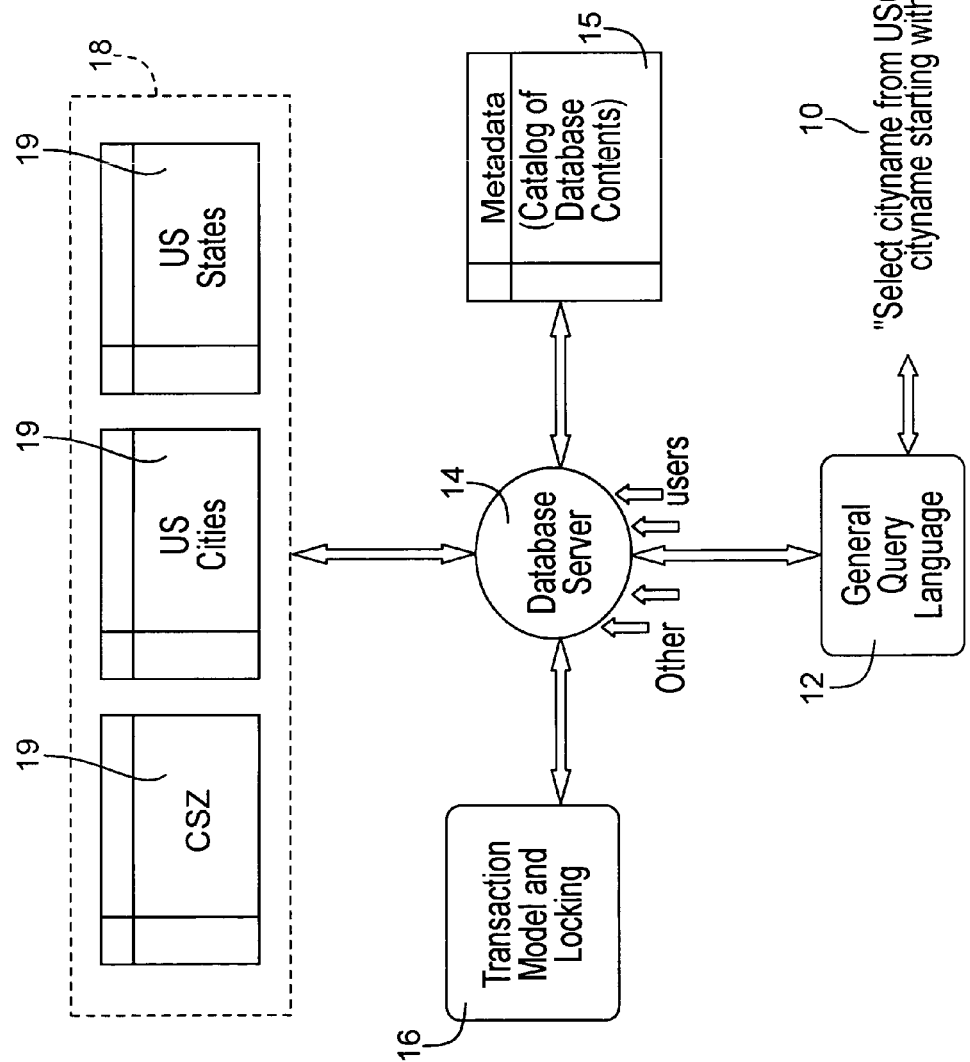
FIG. 1 is a schematic example of a traditional database system typical of the prior art.
Figure 2:
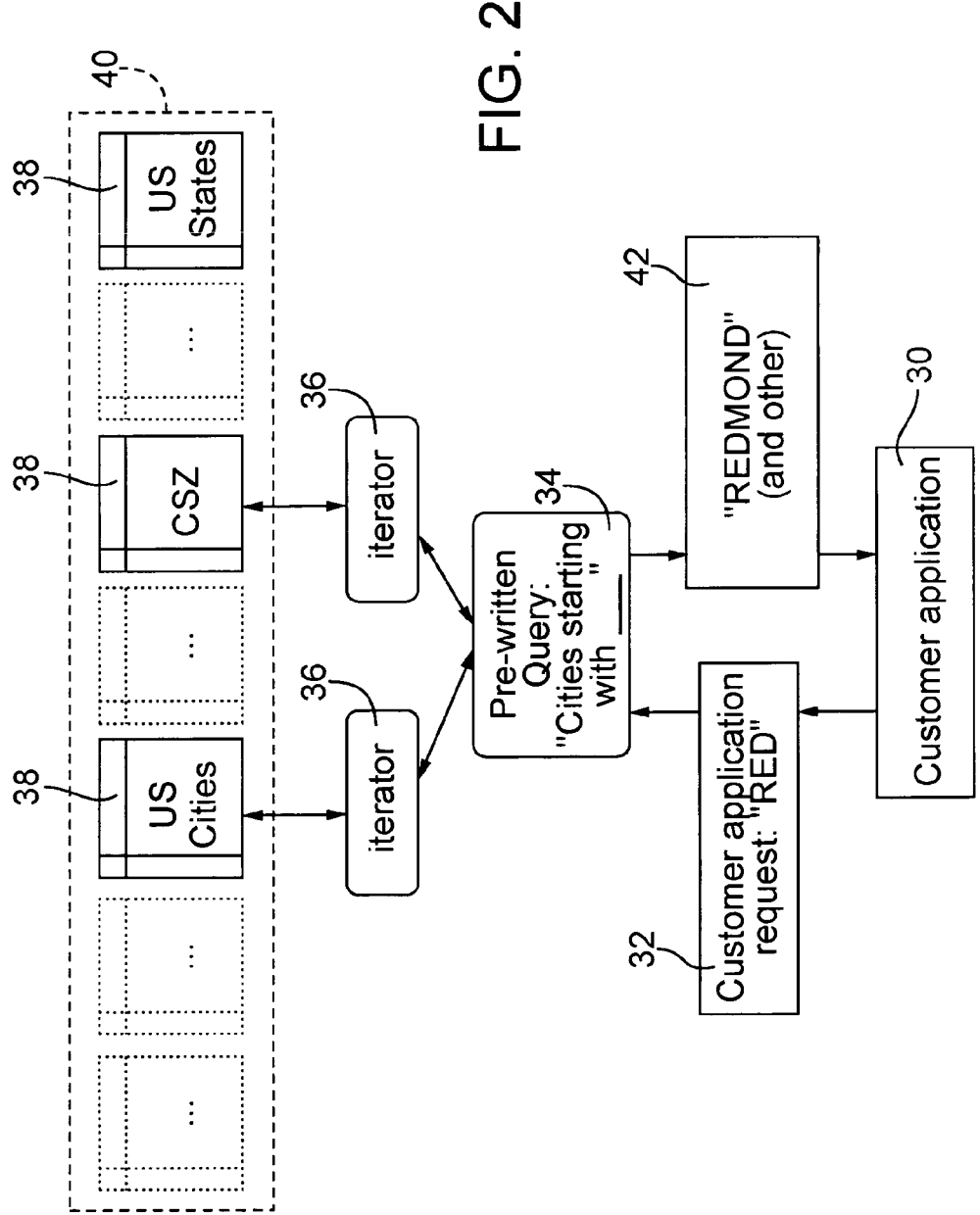
FIG. 2 is a schematic example of crystallized database system employing data crystals in accordance with a preferred embodiment of the present invention.

Automated data capture and perfection typically involves a customer application that receives an input of data and then uses a reference database to compare the input data for correction or verification. FIG. 2 illustrates a preferred embodiment in accordance with the present invention. With reference to FIG. 2, a customer application 30 identifies a requirement for data 32. The customer application 30 has access to a query 34 of a predefined type for requesting data from a crystal database 40. Depending on the type of requirement for data 32, a query 34 directs one or more iterators 36 to extract data from one or more data crystals 38 comprising the crystal database 40 in order to supply an answer 42 for use by the customer application 30. The term "iterator" 36 is used, in part, because satisfying one query 34 may require several successive data extractions from the crystal database 40. An iterator 36 can extract the data, one record at a time, until the customer application 30 no longer identifies a requirement for data 32. In an alternative embodiment, a viewer (not shown) could be used in place of an iterator 36 or in combination with an iterator 36 to access a particular data record. The term "viewer" is used to refer to code that only has the ability to view a data record. An iterator 36 has the additional ability to go to the next data record in the data crystal, and it can determine when it has reached the end of a range in the data crystal 38 and send an "out of data" signal back to the customer application 30.

Figure 3:
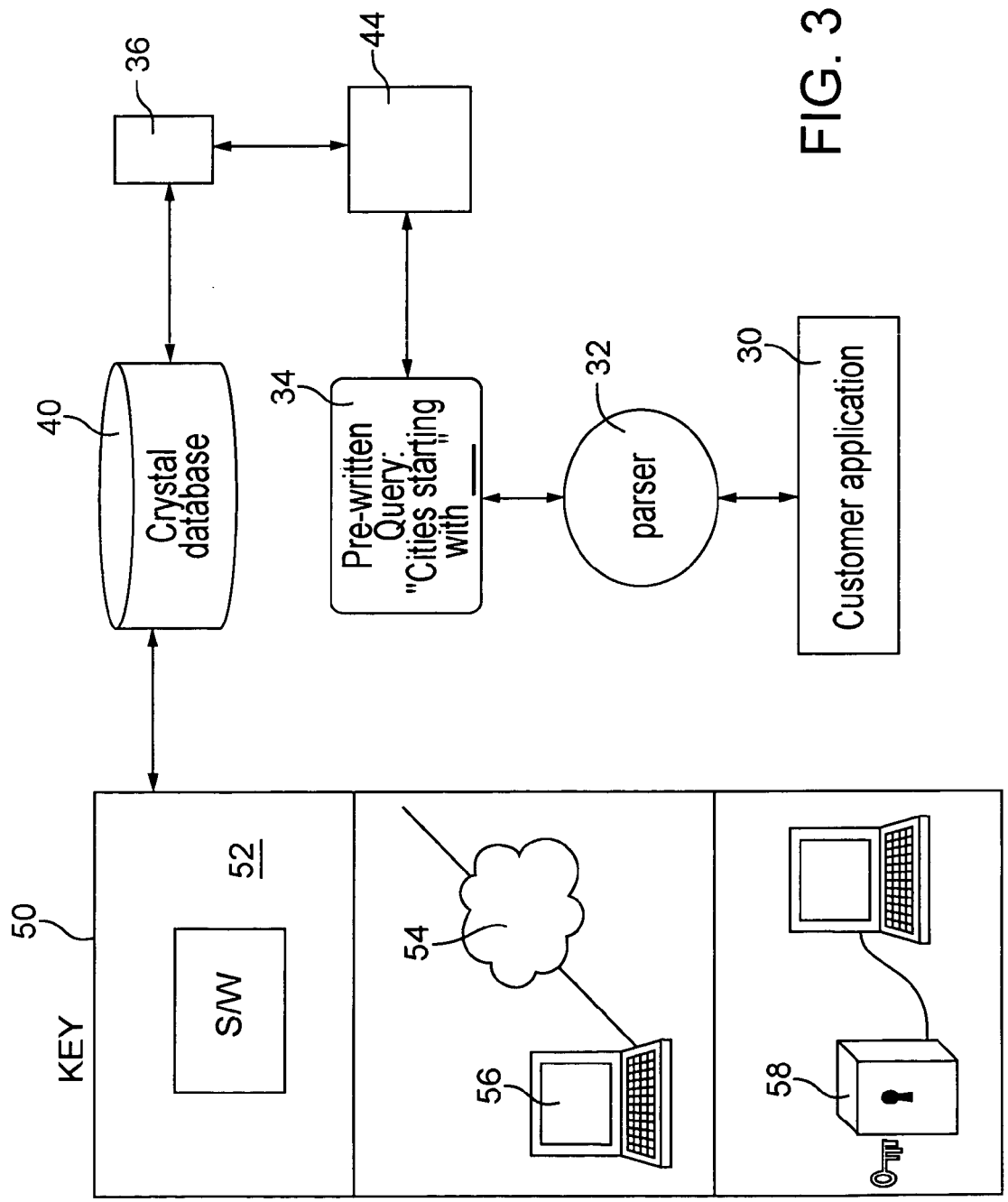
FIG. 3 depicts a communication chain typical of an embodiment of the present invention.

With reference to FIG. 3, the crystal database 40 of FIG. 2 is illustrated in use for automated data capture and perfection. FIG. 3 begins with the customer application 30 that identifies a requirement for data 32. The requirement for data 32 can come from the customer application 30, or it can be interpreted by the customer application 30 while originating from a source external to the customer application 30. In the automated data capture and perfection context, the requirement for data 32 can be supplied by a parser program that separates data into fields and checks those fields against the data fields in any available reference data records. The presence of a requirement for data 32 is then used to call a query 34 that directs the iterator 36, through an optional iterator interface 44, to access the crystal database 40. In a preferred embodiment, the query 34 is of a predefined query type and does not support a general query language such as that used in structured query language applications. The predefined query 34 is called by the customer application 30 responsive to type of requirement for data 32. For example, an iterator 36 can be directed to begin at zip code 98000 and "retrieve the next valid zip code" from the crystal database 40 of all valid United States postal zip codes in increasing numeric value. A predefined query 34 could request all valid zip codes "ranging from 98000 to 98999," where the blanks have been filled in by the customer application 30 in order to identify an illegible zip code on an envelope starting with the numbers "98." The iterator 36 would then access the data records, one at a time, extracting all valid zip codes satisfying the desired range.

The iterator 36 also can include an iterator interface 44 for ensuring ongoing functionality when a new version of the crystal database 40, or a portion thereof, is provided. Also, in FIG. 3, access to the crystal database 40 can be contingent upon database customer authentication through use of an access key 50. The access key 50 can include information pertaining to the identity of the database customer, a particular site or computer licensed for use of the database, time limit or expiration date for use of the database, a limit to the number of times data can be accessed by a particular customer, or similar information pertaining to identification and rights. The access key 50 can be a software key 52, a hardware key or dongle 58, or the access key 50 can be a connection to a network 54 in order to obtain customer authentication or validation from an external computer or site 56. By placing the access key 50 on an external site 56, with respect to the customer's computer system, the customer is not able to alter the clock of the onsite computer using the crystal database 40 in order to circumvent an expiration date incorporated into the access key 50. Portions of the access key 50 implemented as software can be encrypted for additional security. These are simply various examples of alternative embodiments of an access key 50. An access key 50 may incorporate any one, or all, of the above security mechanisms. An access key 50 may also include various other systems that are known and commonly used for computer access and security, and the key or encoding may be different for each data crystal. Also, there may be varying levels of obfuscation per database. For example, a crystallized database can be heavily encrypted for shipping to a customer who can then decrypt the database, which can still maintain a different level or type of obfuscation.

Referring to FIG. 2 and FIG. 3, the data records and data crystals 38 in the crystal database 40 are obfuscated. Generally speaking, obfuscation includes any method of rendering data illegible to clear text viewers. Obfuscation can include compression, encryption, exclusive-OR (XOR) operations, altering the location or number of bits representing data, or any of multiple other methods of data manipulation known in the computer arts. In a preferred embodiment, the obfuscation method is data compression with periodic encryption of selected data records. For example, in a data crystal containing 500,000 data records, the preferred embodiment would compress all of the data records, but it would only encrypt the records at some arbitrarily chosen, periodic increment, such as every $1000^{th}$ record. This allows faster access time than if the records were fully encrypted, but it provides greater security than compression alone. The compression reduces system memory requirements without slowing access time to data records to the extent that full encryption would. However, by encrypting selected data records, more security is provided than with pure compression, and average access time is not drastically affected. If an application using the crystal database 40 encounters an encrypted data record but does not have the decryption algorithm, the database can be disabled. The decryption algorithm can be supplied to authenticated customers as part of the customer application 30 software, and its use can be contingent upon database customer authentication through the access key 50. In a preferred embodiment, valuable data records are protected through obfuscation; however, other data records, which are not very valuable, could be supplied for access in a clear text format. One example of using this approach would be if the customer supplied their own spreadsheet or data file for reference queries. Because the data is supplied by the customer, the database designer has no reason to obfuscate the data and prevent the customer from having direct access.

FIG. 4 illustrates an example of an XOR operation of a type typically used for obfuscation of data records in one of the data crystals 38. With reference to FIG. 4, an original binary string 60 is compared to a binary key 62 to achieve an obfuscated result 64. The obfuscated result 64 is determined based on the comparison of the original binary string 60 to the binary key 62 using a predefined XOR rule 66. The XOR rule 66 determines the result based on the combination of individual bits. In order to de-obfuscate the obfuscated result 64, the obfuscated result 64 can again be compared to the binary key 62, supplied to an authenticated database customer, to obtain the original binary string 60.

Figure 5:
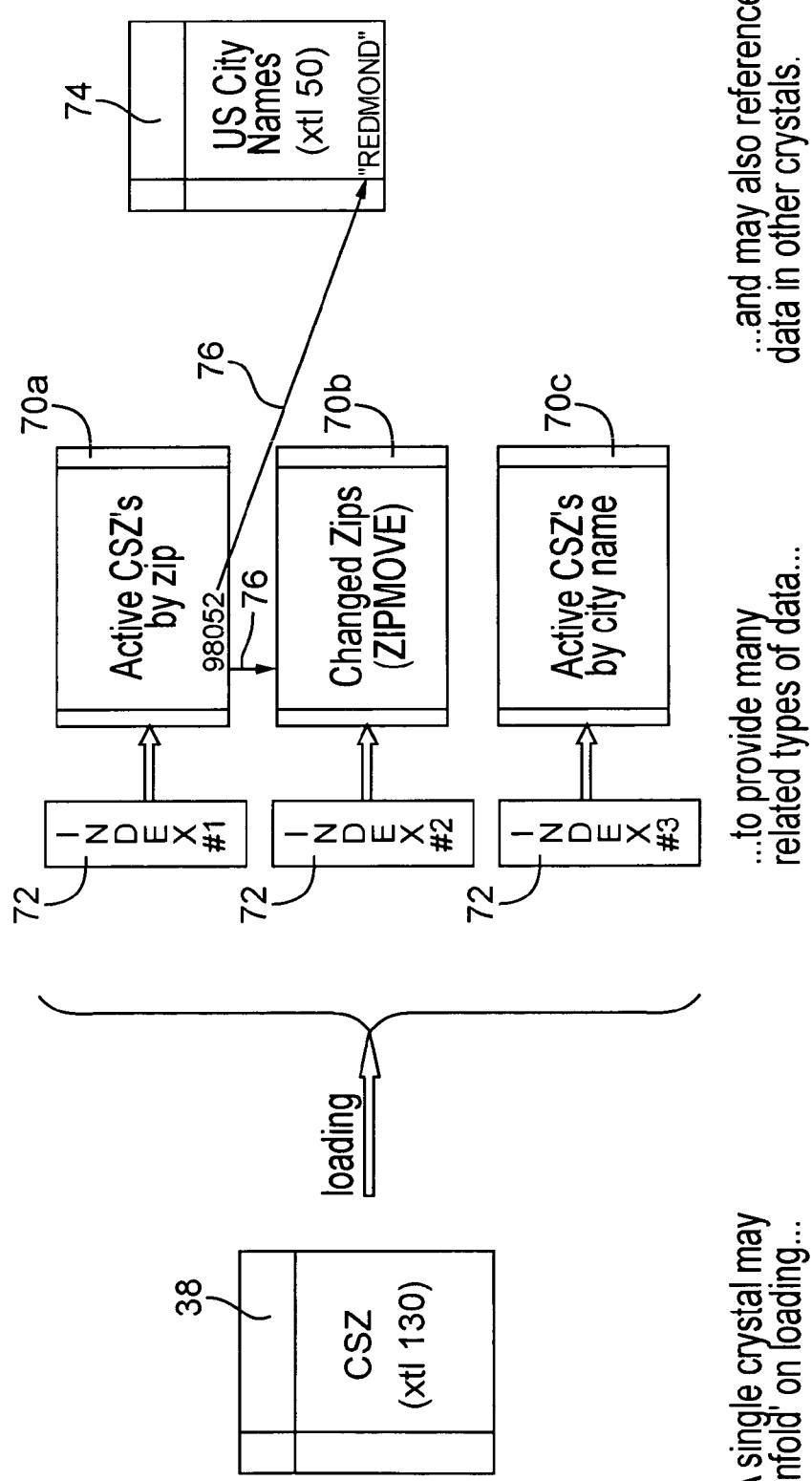
FIG. 5 depicts an embodiment of the present invention in which multiple data tables are included within one data crystal.

With reference to FIG. 5, a data crystal 38 can contain several different data tables 70a-70c. Each data table 70a-70c can also have one or more indexes 72. The multiple data tables 70a-70c frequently tabularize related types of data. For example, in the context of automated data capture and perfection, related data tables can include a table of zip codes organized by increasing numeric value 70a and a table of zip codes organized by the city name to which they correspond 70c. An individual data record in a data table 70a can also include a pointer 76 to a different data table 70b within the same data crystal 38 or a different data crystal 74. As used throughout this specification and the attached claims, the term "pointer" generally refers to a reference to a location in memory, a reference to a location at which data is stored, or a reference to a block of locations at which data is stored.

The crystallization procedure can be applied to any traditional database, even if it is presently in a clear text form. Prior to this invention, once a clear text database was sent to a customer, it was no longer secure and could be subject to unauthorized reproduction or data extraction. For traditional databases, the security effectively ended when the database was sent from the designer's site. However, consistent with the present invention, a traditional database can be converted into a crystallized database. That allows the designer to make several copies and send them to customers' sites without jeopardizing data security. The data records in the crystallized database will be secure at each site to which the database is copied. Furthermore, because the customer's right to use data in the crystallized database can be contingent on having a key, and that key can be made to expire, a database designer using an embodiment of the present invention effectively has a way to repossess the data given to the customer by restricting future rights to use the database.

As an additional implementation, a database designer can provide a customer instructions on the crystallization process or set up the crystals for the customer, and then the customer can supply the data records to be crystallized directly into the data crystals. This would be a preferred embodiment where the customer's data is highly sensitive and the customer does not want the database designer to view or possess the sensitive data. In this manner, even though a database designer may have created the crystallized database for a customer, the database designer himself may never have had access to or possession of the customer's data. Furthermore, if the customer configures his own access key for those data crystals, the database designer will never have access to the sensitive data, because he will never have the key.

Figure 6:
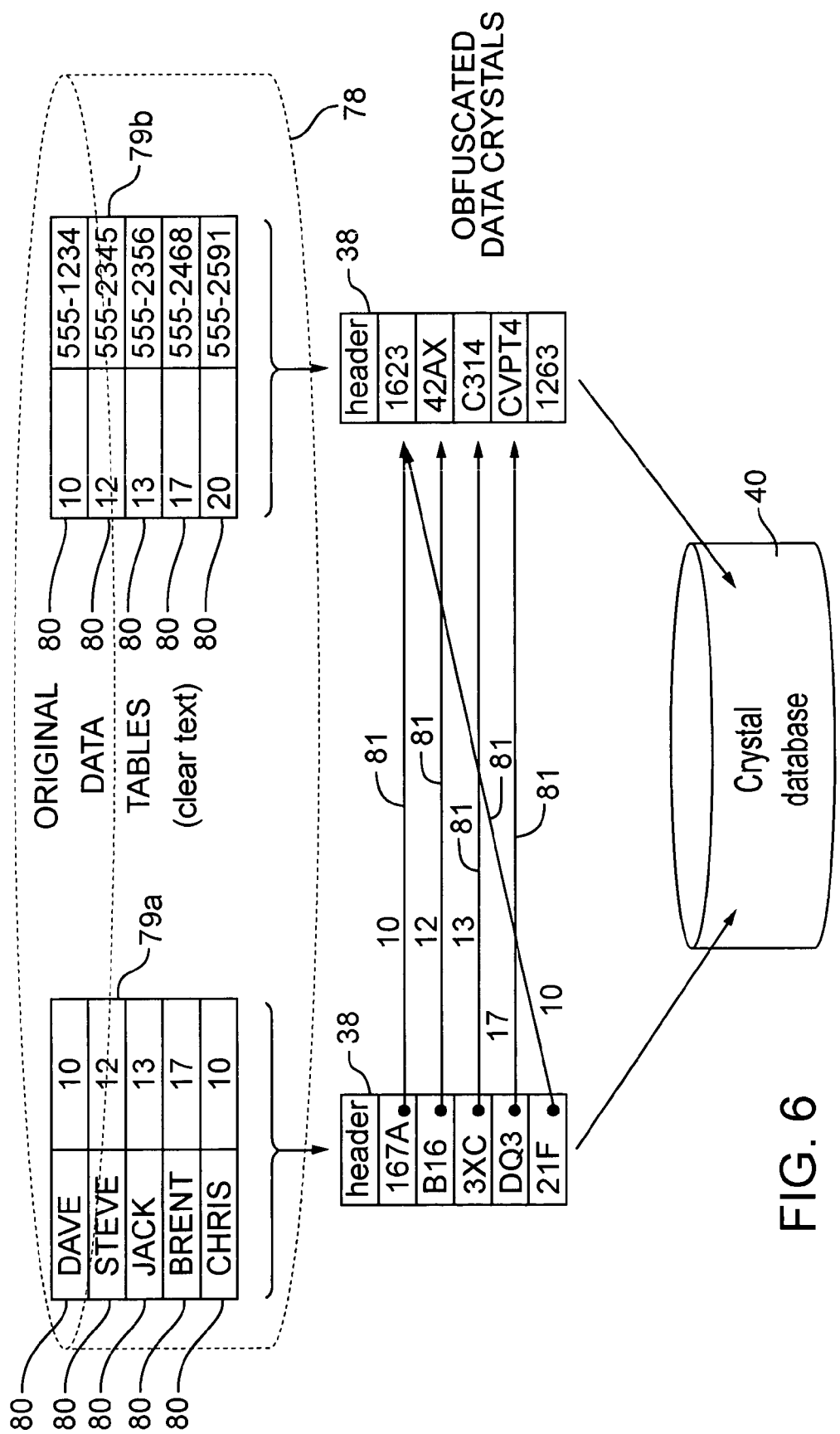
FIG. 6 depicts the progression from data in an original clear text database to obfuscated data stored in a crystallized database.
Figure 7:
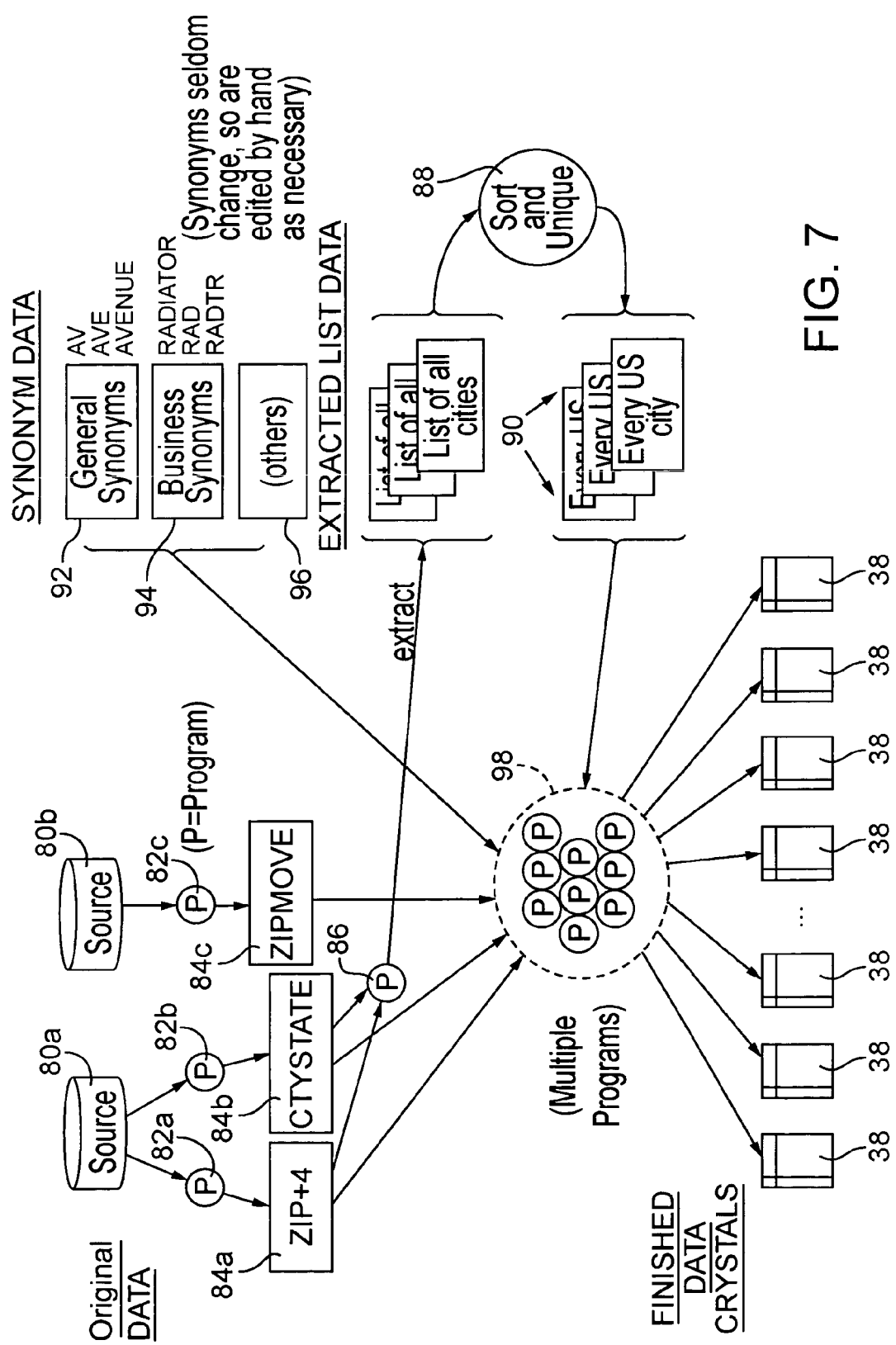
FIG. 7 schematically illustrates the process of building the data crystals of FIG. 2.
Figure 8:
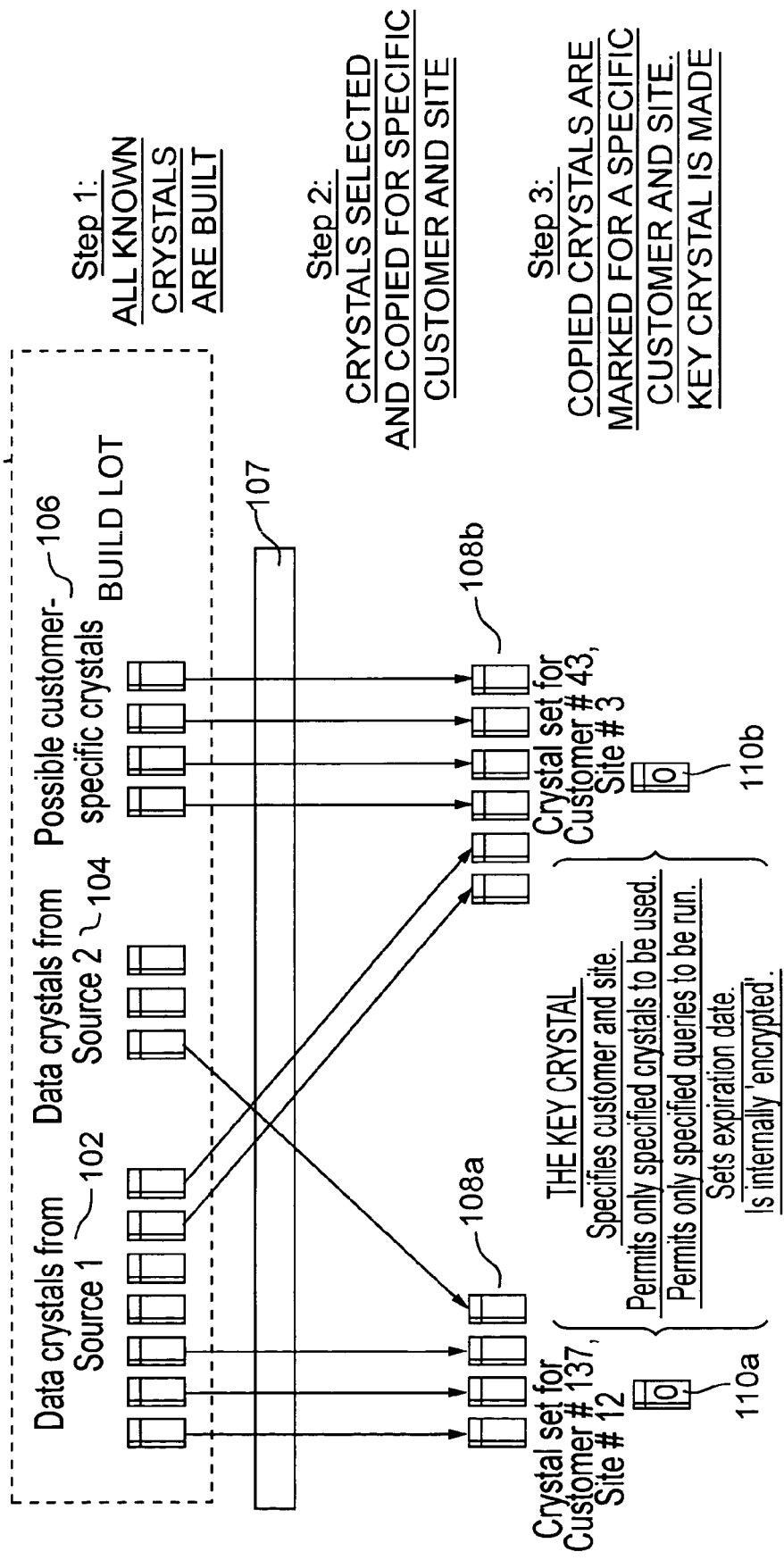
FIG. 8 illustrates a simplified version of the steps involved in creating a customer-specific crystal database.

FIGS. 6-8 depict an example of the process of constructing obfuscated data crystals. With reference to FIG. 6, the database designer begins with an original database 78 usually stored in clear text format. The original database 78 may have multiple data tables 79a and 79b and multiple data records 80. The individual records 80 are then obfuscated and stored in data crystals 38. Any required interconnecting pointers 81 can also be added. While a data crystal 38 may contain multiple data tables, it can also be categorized to only contain one particular type of information. The obfuscated data crystals 38 comprise a crystal database 40. In a presently preferred embodiment, in order to facilitate the construction of individual data crystals 38, the database designer can compile a library of code for common data fields and structures contained in crystals. Then, when the database designer constructs data crystals 38 for a particular customer, the database designer can essentially "cut and paste" the appropriate code from the code library for the particular data fields and structure desired. This allows the database designer to avoid writing unique code each time a new data crystal 38 is created.

FIG. 7 depicts the process of gathering information to construct the data crystals 38 that will be stored in a crystal database. In particular, the embodiment illustrated in FIG. 7 provides a more comprehensive illustration of the process of data crystal creation depicted in FIG. 6. FIG. 7 begins with obtaining data, usually in clear text form, from multiple original databases 80a and 80b. Alternatively, data may be obtained from a single original database or other data sources. The database designer then uses a series of extraction programs 82a-82c to extract data related to one or more data categories 84a-84c. Data records from related categories 84 can be combined by a combination or comparison program 86. The combination or comparison program 86 sends the data records to a sorter 88 which reorganizes the data into a form useful for the database designer. The reorganized data is then organized and stored in a data compilation 90. The organized data in the data compilation 90 is further combined with general synonyms 92, business synonyms 94 or other useful information 96 that would be helpful to the database customer. The data records are then obfuscated and copied into individual crystals 38 by data construction programs 98. These data crystals 38 are then copied to form a crystal database that is sent to the database customer. The specific data crystals 38 in the crystal database are selected based on the particular needs of the database customer. Custom selection of the data crystals 38 in the crystal database provides an opportunity to serve the database customer's specific data needs.

FIG. 8 illustrates the process of customizing the crystal database based on the data needs of the particular database customer. With reference to FIG. 8, in the first step, all known crystals are created and gathered together into a build lot 100. The build lot 100 essentially consolidates all available data crystals for distribution to the database customer. FIG. 8 illustrates data crystals from a first source 102 and data crystals from a second source 104. In alternative embodiments, there could be more or less than two sources of data crystals. The desired data crystals are then selected and copied for a specific customer and site. Further obfuscation of the data in the data crystals can be done while copying. This can occur as an optional customizable obfuscation procedure 107. FIG. 8 illustrates the data crystals from the first source 102 and the data crystals from the second source 104 being copied into two separate crystal sets 108a and 108b. The crystal sets 108a and 108b are customized for the particular database customer's needs. For example, customer-specific crystals 106 can be copied into the crystal set 108b of the customer for which they were created. Finally, the individual crystals in each crystal set 108a and 108b can be coded with date-, customer-, and site-specific data, and a key crystal 110a and 110b can be constructed for each crystal set 108a and 108b. The key crystal 110a and 110b aids in authenticating that the user has access to the crystal database. Examples of the process of authentication can include verifying the identity of the user or that the user currently has rights to access specific crystals in the crystal database. A preferred method of authentication is through using a checksum procedure, whereby the sum of the values for the data, customer, site, and build lot must equal a specific predefined number. Use of the checksum procedure helps ensure that de-obfuscation is performed correctly. By requiring an iterator to perform a checksum procedure and verify that the expected value is present, successful de-obfuscation can be confirmed. If an unsuccessful de-obfuscation is detected, the iterator can send a signal to deactivate the data crystals. A checksum procedure can also be performed after data crystals are first created in a build lot in order to ensure data integrity between crystals.

Figure 9:
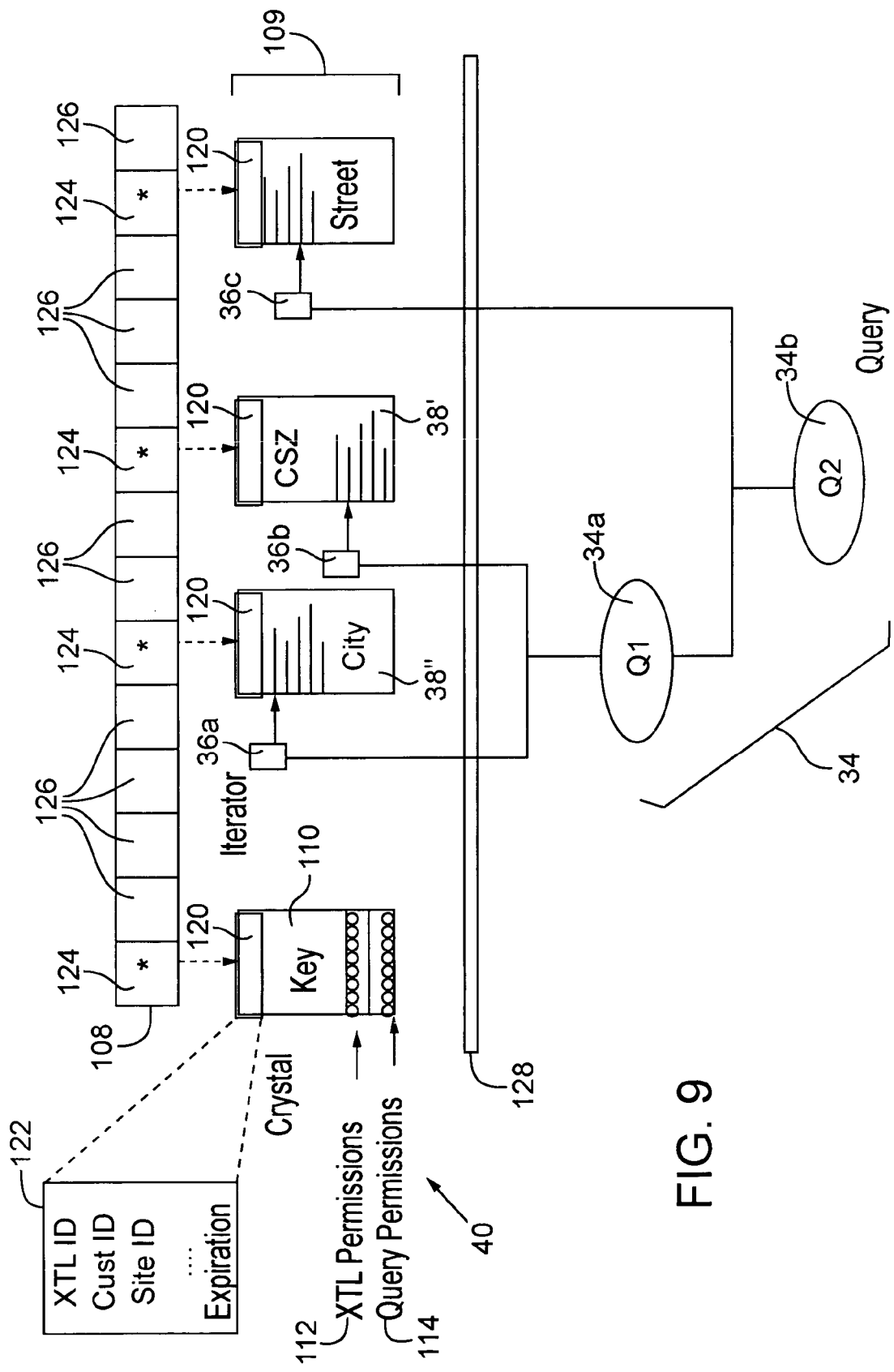
FIG. 9 illustrates the operating relationship between different data crystals, predefined queries, and iterators in one embodiment of the present invention.

FIG. 9 illustrates the process that occurs at a particular customer's site when using the crystal database 40 of FIG. 2. The customer is supplied with a crystal database 40 including a crystal set 108. The crystal set 108 contains all the individual data crystals sent to the customer. In a preferred embodiment, the crystal set 108 includes active crystals 124 and inactive crystals 126. The active crystals 124 are crystals to which the customer has valid rights to access. The inactive crystals 126, although complete with respect to the information they contain, are crystals to which the customer does not have valid rights to access. When the crystal set 108 is being used by the customer, the active crystals are registered in memory in a crystal registry 109 for ease of use or reference. A key crystal 110, which is supplied to each customer, can contain crystal permission information 112 as well as query permission information 114. The crystal permission information 112 indicates which crystals are active and which crystals are inactive for that individual customer. Similarly, the query permission information 114 stores information pertaining to which of the predefined queries 34a and 34b the individual customer is licensed or permitted to use. In a preferred embodiment, the database customer is provided with a crystal database containing both active crystals 124 and inactive crystals 126, as well as permissible queries 34a and 34b and impermissible queries (not shown). If the customer wishes to access the data records within the inactive crystals 126 or to gain permission to use impermissible queries, the database designer can send the customer a new key crystal with updated crystal permission information 112 and updated query permission information 114. The new key crystal would contain information permitting the customer to use the newly-permitted queries and newly-active crystals when the new key crystal is accessed by an iterator. In this manner, the customer can quickly change the type of information to which he has access without replacing the entire database.

The data crystals also contain a header block 120 that contains customization information 122 pertaining to the customer. The customization information 122 can include crystal identification, customer identification, site identification, or information dealing with expiration of the access rights to the data crystals in the crystal database. In operation, the database customer's application calls a predefined query 34 including nested queries 34a and 34b. The nested queries 34a and 34b direct iterators 36a-36c to obtain data from the database. The iterators 36a-36c can be pieces of code that know how to locate, retrieve, and de-obfuscate the information in each data crystal that will satisfy the predefined query 34. The iterators 36a-36c are crystal specific, and one query 34a may direct multiple iterators 36a and 36b to obtain the desired information. Similarly, if the application calls one type of query 34a, a second query 34b may also be required to obtain the desired information. Accordingly, multiple queries 34a and 34b, each of which is predefined, may be contemporaneously or successively called to employ multiple iterators 36a-36c each iterator corresponding to one data crystal.

Additionally, a query 34b can incorporate one or more other predefined queries 34a by reference. In this way queries 34a and 34b of any desired complexity can be built. The actual complexity depends on the database customer's needs and the type of problem being solved. Within each data crystal, individual data records may include pointers to other data records, or even other data crystals. Pointers can also point to a block of data records. By pointing to a block of data records, embodiments of this invention can conduct fuzzy matching logic as discussed below and illustrated in FIG. 15. An iterator 36a-36c can also be table-specific, so that a data crystal containing multiple data tables and indexes, as described in FIG. 5 and the accompanying text, can provide an iterator for each table. FIG. 9 also depicts a security boundary 128. If a customer has direct access to the queries 34a and 34b, the data is still secure, but if the customer has direct access to the iterators 36a-36c, the data is not secure.

Queries can call other queries, and they can be predefined to access almost the entire database, depending on the required complexity of the questions the queries will be called to answer. A more complex query can call another query that knows how to do one simple aspect of the complex query's task. Each query can also call as many iterators as necessary to answer that query's task. As an example of a simple query and iterator interchange, as illustrated in FIG. 9, a query 34a could ask a predefined question type, such as: "What is a city name for zip code 98052?" The type of question was predefined, but the actual blank was filled in by the customer application. The blank could also be filled in by a range of zip codes. The query 34a then directs a first iterator 36b to look for "98052" in the city state zip data crystal 38'. The first iterator 36b locates and supplies a reference or pointer that is then used by a second iterator 36a, also directed by the original query 34a, to find the actual data record desired. The second iterator 36a then locates the data in the city crystal 38" and supplies the actual name of the city. In a simplified form, the steps illustrated above involve locating a zip code in one location, finding out where the city name is stored in a different location, and retrieving the city name from that storage location. The specific intricacies of the referencing or pointer structure are illustrated further in FIG. 10.

Figure 10:
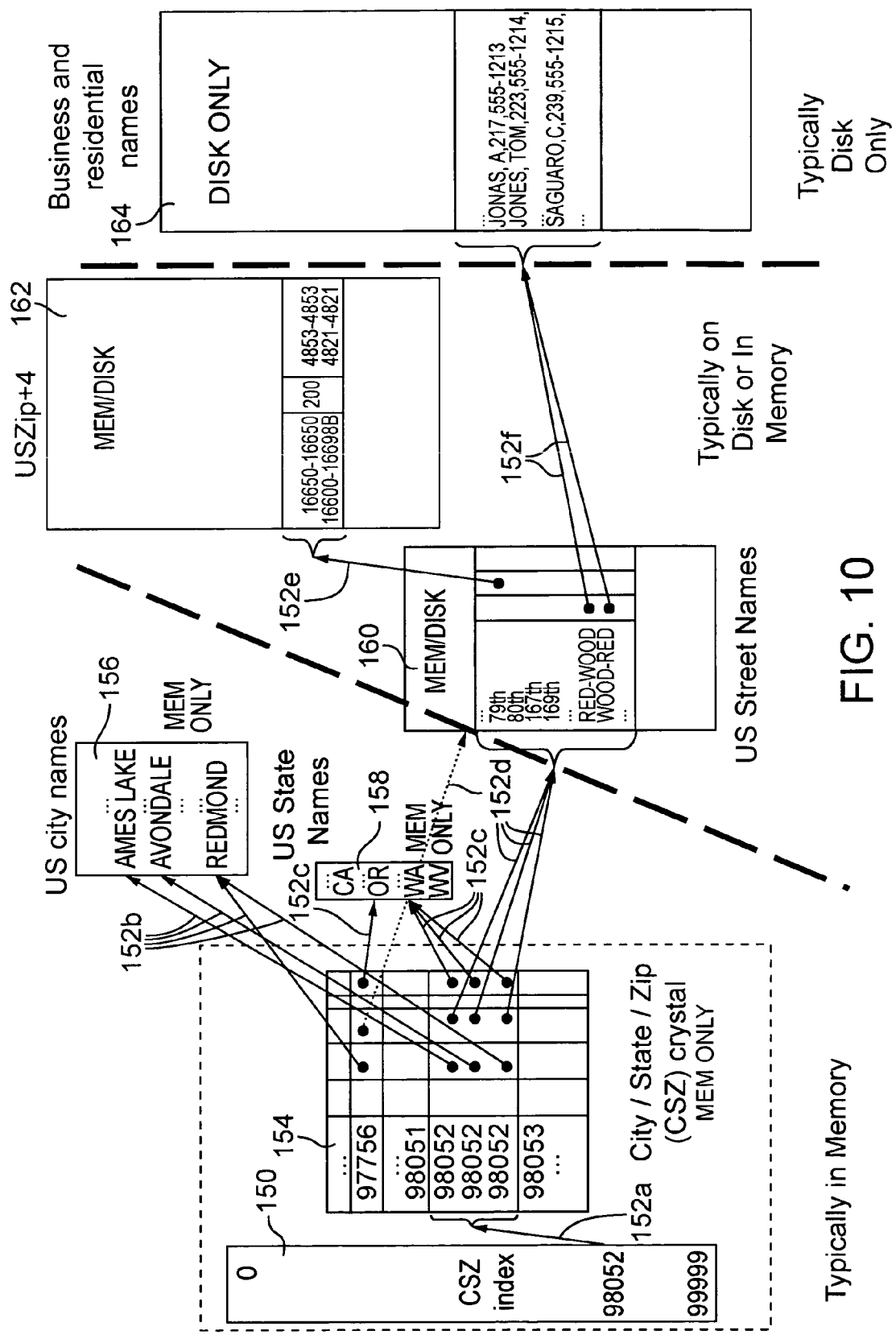
FIG. 10 illustrates the interrelationship among data crystals, as well as the interconnectedness of specific data and data blocks within those data crystals, in a typical crystallized database in accordance with the present invention.

FIG. 10 illustrates the use of pointers to cross-reference data records within multiple data tables or data crystals. FIG. 10 illustrates an embodiment of the present invention that includes data crystals containing data records for use in an automated data capture and perfection system. Often it is necessary, depending on the type of customer application, to link different data records together. For example, zip codes can be linked to U.S. city names, U.S. state names, or even individual residences or businesses at a certain address. With particular reference to FIG. 10, a zip code in a "city, state, and zip" index 150 can be linked via a pointer 152a to the exact range in the zip code table 154 that is appropriate for satisfying a particular query. Use of an index 150 and pointers 152a-152f has particular advantages with respect to compression and reducing search time. An iterator can begin at the index 150, which contains relatively few data records, and then be pointed directly to the desired data in the more substantive data tables or data crystals. In this manner, the iterator only has to access or read data records as needed. In a presently preferred embodiment, an index 150 is generated on-the-fly rather than being permanently stored in the crystal. As originally sent to the customer, the index 150 only includes coded instructions to, upon the opening of the data crystal, first read once through the data in the zip code table 154, for example, in order to generate an index 150. That index 150 is then stored in temporary memory for use while the data crystal is being accessed. If the database system is shut down, the index 150 will have to be regenerated during the next run. Alternatively, if the time required to generate an index 150 would be too great, an index 150 can be stored in its entirety inside a data crystal.

A particular zip code in the zip code table 154 can also contain pointers 152b-152d to several other data records. For example, pointers 152b can link a zip code to records within a city name table 156, or pointers 152c can link a zip code to records within a state name table 158. Pointers 152d can also link a zip code to records within a street information table 160, which in turn can be linked via pointers 152e and 152f to a zip4 table 162 or a business and residential name table 164. Because there can be multiple business or residential names in the business and residential name table 164, a pointer 152f from a data record in the street information 160 will point to a block of data records in the business and residential name table 164. In the context of automated data capture and perfection, this also aids in fuzzy matching because it provides a series of related data fields that provide context when trying to determine the actual contents of a distorted data field or item.

Periodically, a database designer desires to update portions of a crystallized database. Although adding more or different data records to a database can be accomplished routinely, adding structure (such as new data fields, tables, or indexes) often involves developing and incorporating new versions of data crystals. Typically, however, it is desirable to avoid removing structure when a database is updated. Maintaining the existence of original structure helps maintain backwards compatibility with older iterators and customer applications that were designed to access the original structure. To facilitate the updating process, database designers can supply iterator interfaces when a new version of a data crystal is implemented.

Figure 11A:
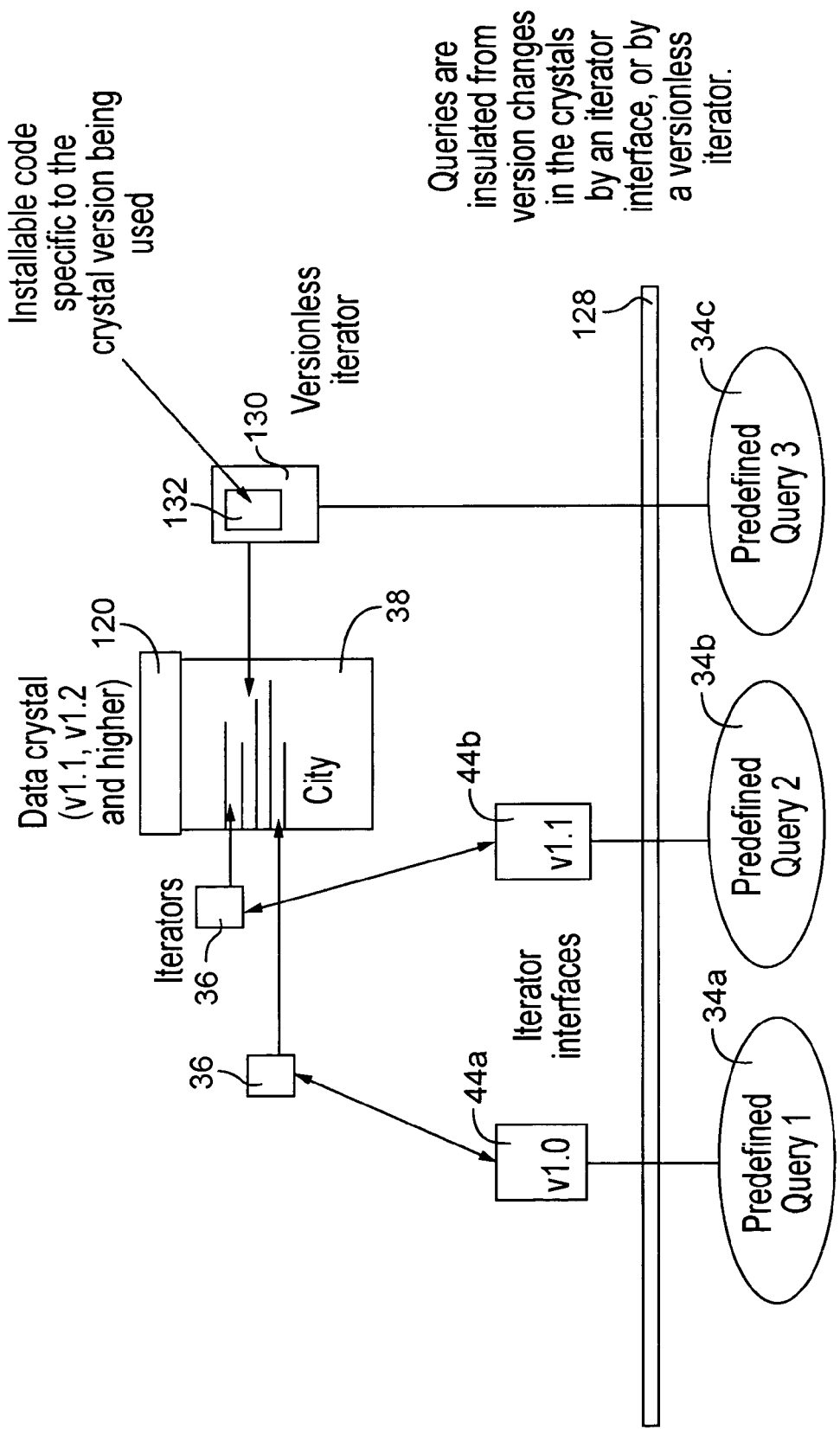
FIG. 11A schematically illustrates the use of iterator interfaces to maintain consistent operation between updated and previous versions of database components.

FIG. 11A illustrates the use of an iterator interface 44a and 44b to ensure continuing functionality when a new or updated data crystal 38 is provided to a customer. A predefined query 34a-34c is originally defined to reference a particular version of an iterator 36, but because the iterator 36 has to correspond directly to the data crystal 38 when a new version of a data crystal 38 is created, a new version of the iterator 36 is also created by the database designer. This is because the iterator is required to understand the current structure of the data in the data crystal 38. The new version of the iterator 36 is desirable because locations where the old version of the iterator 36 knew to look for a particular data record may no longer be accurate. The iterator interface 44a and 44b is provided in order to ensure that the predefined query 34a-34c will be correctly interpreted by the new version of the iterator. New versions of the iterator 36 are made compatible with the iterator interface 44a and 44b. A predefined query 34a may request data via an iterator interface 44a for older data crystals 38 and iterators 36, which then translates between the predefined query 34a and the new version of the iterator 36. Essentially, the iterator interface 44a and 44b operates like a mask to make the iterator 36 and data crystal 38 of the current version look like ones of prior versions, for the benefit of items designed to operate with the prior versions. Accordingly, any predefined query 34a-36c will always function correctly. In this manner, even after a predefined query 34a-34c is defined, it can function with multiple successive versions of the data crystal 38 so long as an iterator interface 44a and 44b is supplied to provide a consistent interface among the subsequent versions of the data crystal 38.

FIG. 11A depicts a versionless iterator 130 in accordance with an alternative embodiment of the present invention. With reference to FIG. 11A, the versionless iterator 130 can be used in place of an iterator 36 and iterator interface 44. The versionless iterator 130 incorporates installable code 132 specific to the current version of the data crystal 38 being used. When a predefined query 34c makes a request of a versionless iterator 130, the versionless iterator 130 selects or is provided with additional installable code 132 that allows it to operate with whatever version of the data crystal 38 is currently installed in the crystal database. One example of the installable code 132 is a viewer programmed to access the data in its current version. Because the purpose of an iterator interface 44a and 44b is to protect a query 34a-34c from version changes in the data crystal 38, in this embodiment, the iterator interface 44a and 44b is not necessary and can be omitted. The query 34c will direct the versionless iterator 130 directly.

Figure 11B:
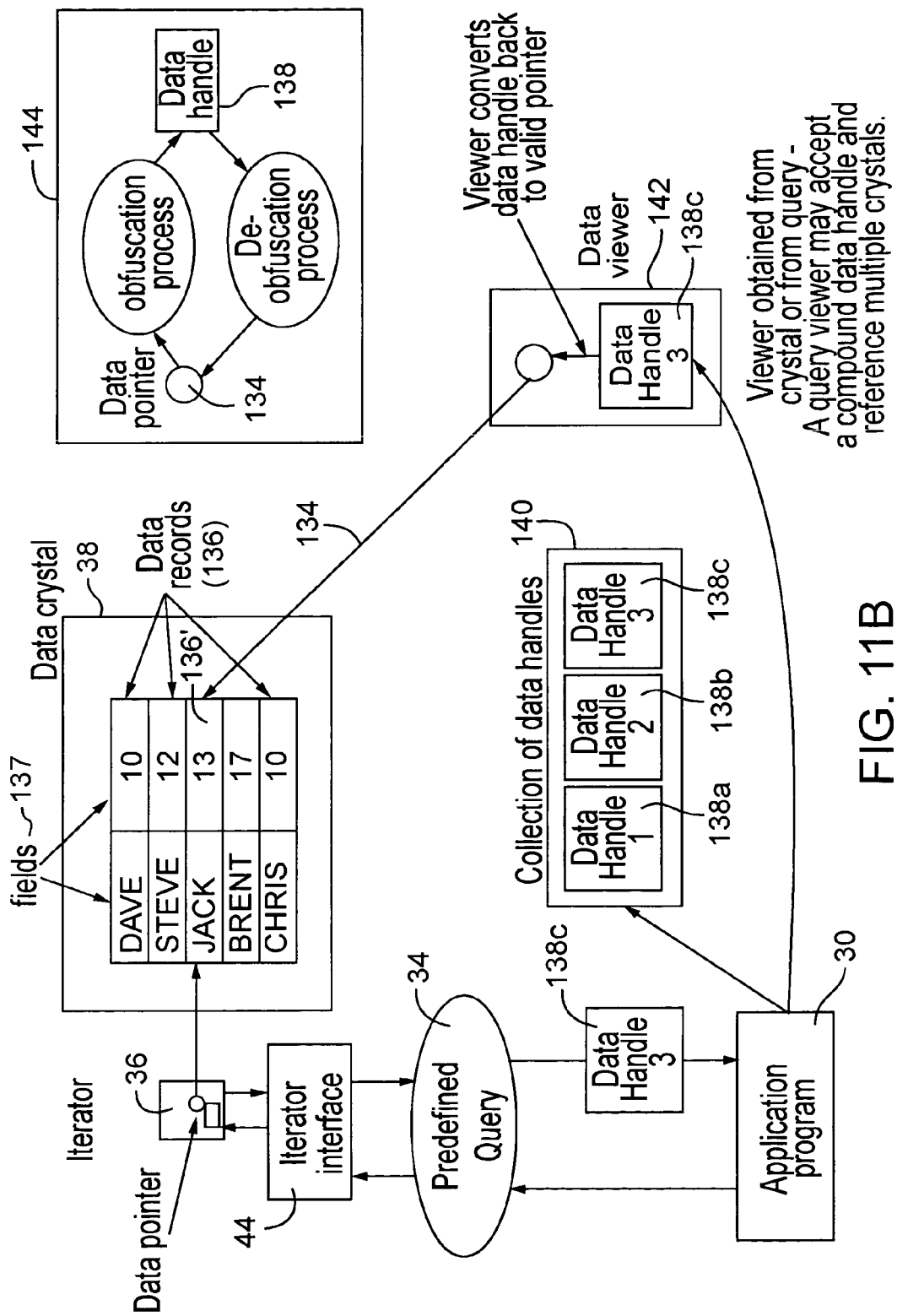
FIG. 11B depicts the use of handles and viewers for saving pointers to data records for future reference and access.

FIG. 11B illustrates an example of a preferred embodiment of the present invention, with a customer application 30 that needs to obtain and save pointers 134 to data records 136 for future reference. Pointers 134 to be held by database customers are referred to as data handles 138a-138c. In FIG. 11B, a customer application 30 evaluates information coming from the query 34. When it detects a data record of specific interest 136', it may request a data handle 138c for such item. The query 34 will in turn obtain a data handle 138c pointing to the current record 136' from the iterator 36 and give the data handle 138c to the customer application 30. The customer application 30 may form an array or collection 140 of such data handles 138a-138c. Later, the customer application 30 can request a data viewer 142 for each crystal. When a saved data handle 138c is presented to the viewer 142, it locates the desired record 136' again and makes its contents available to the customer application 30.

In another, similar implementation, the query 34 may collect together data handles 138a-138c from individual iterators 36 into a compound data handle (not shown). The query 34 will then, upon request, provide the customer application 30 with a viewer 142 capable of interpreting multiple iterator data handles 138a-138c at one time. This provides an additional means of insulating a customer application 30 from the data crystals 38 and iterators 36. In such a case, the viewer 142 can be built selectively to provide access to only some of the data available in the data crystal 38.

For security, some form of obfuscation process 144 may be done on the pointers 134 to create data handles 138, which are then only usable for the intended purpose of retrieving data records 136 previously located and returned by the query 34. Additionally, viewers 142 may be constructed that return only selected fields 137 from the data records 136.

Figure 12:
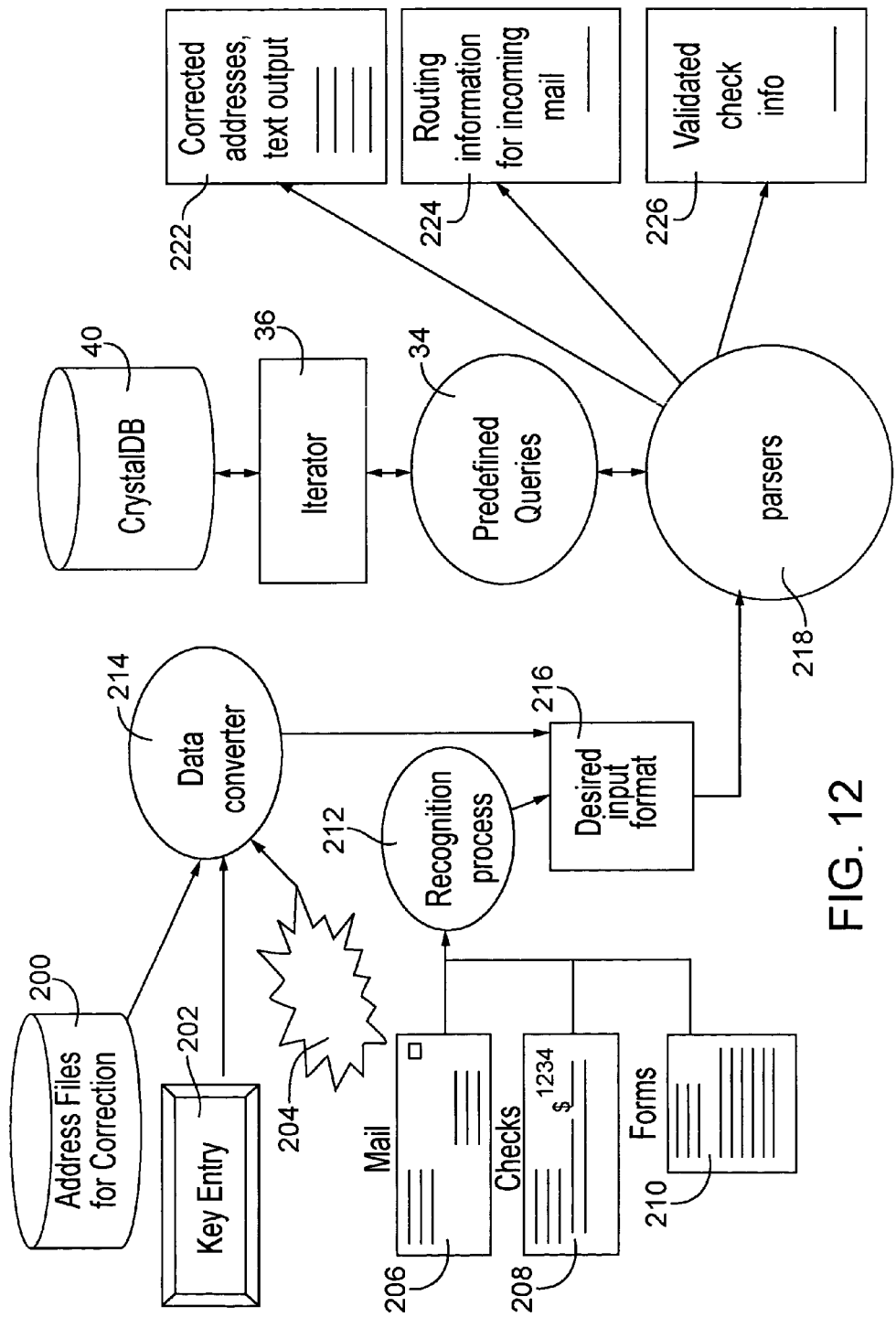
FIG. 12 schematically illustrates the use of an embodiment of the present invention for use in an automated data capture and perfection system.

FIG. 12 illustrates an embodiment of the present invention for use in an automated data capture and perfection system. In the automated data capture and perfection system, the first step includes obtaining data. The data can be obtained from a stored data source 200 (such as another database), from a network or Web site 204 or key entry 202, or from any of several alternate sources such as digital capture of data from mail 206, checks 208, or paper forms 210. If the input data comes from the stored data source 200, network or Web site 204, or key entry 202, the data is already in digital form and can be converted to a desired format. This is done with a data converter 214. If the data input comes from mail 206, checks 208, paper forms 210, or similar items, the data must first be obtained in a digital format. This can be done through a recognition process 212. Recognition can include passing an item through an optical scanner or using a digital camera to provide an image, then applying existing optical character recognition (OCR) programs to extract the text into a digital format. Once in a digital format, the data can also be converted into any desired structure or format 216.

One example of the automated data capture and perfection system would be to obtain data defining a United States postal address from a postal envelope and then compare the obtained address to a known reference address stored in the crystal database 40 in order to identify an illegible city name in the address. In FIG. 12, the data comprising the address is supplied to a customer application that does data record parsing. The parser application 218 divides the data record address into pieces expected to correspond to data fields. The predefined queries 34 are then called to direct iterators 36 to request data from the crystal database 40. For example, if both a city name and a zip code are distorted in a postal address, and the city appears to begin with the letters "RED," a predefined query 34 can be called to ask for a list of all U.S. cities that start with the letters "RED." It could also be defined to ask for cities that appear to start with the letters "RED" or contain the letters "RED." Once the results are obtained from the crystal database 40, a predefined query 34 can also be used to verify or determine possibilities for the distorted zip code. If the city name data and zip code data are connected with pointers, one of the query results for the possible city names should match with one of the query results for the zip code. The correct result can then be sent in any of numerous forms of output. Examples of output include a corrected address 222, routing information for incoming mail 224, or validated check information 226. The output can also be structured however the database customer prefers, and may depend on the original source or form of the data.

Figure 13:
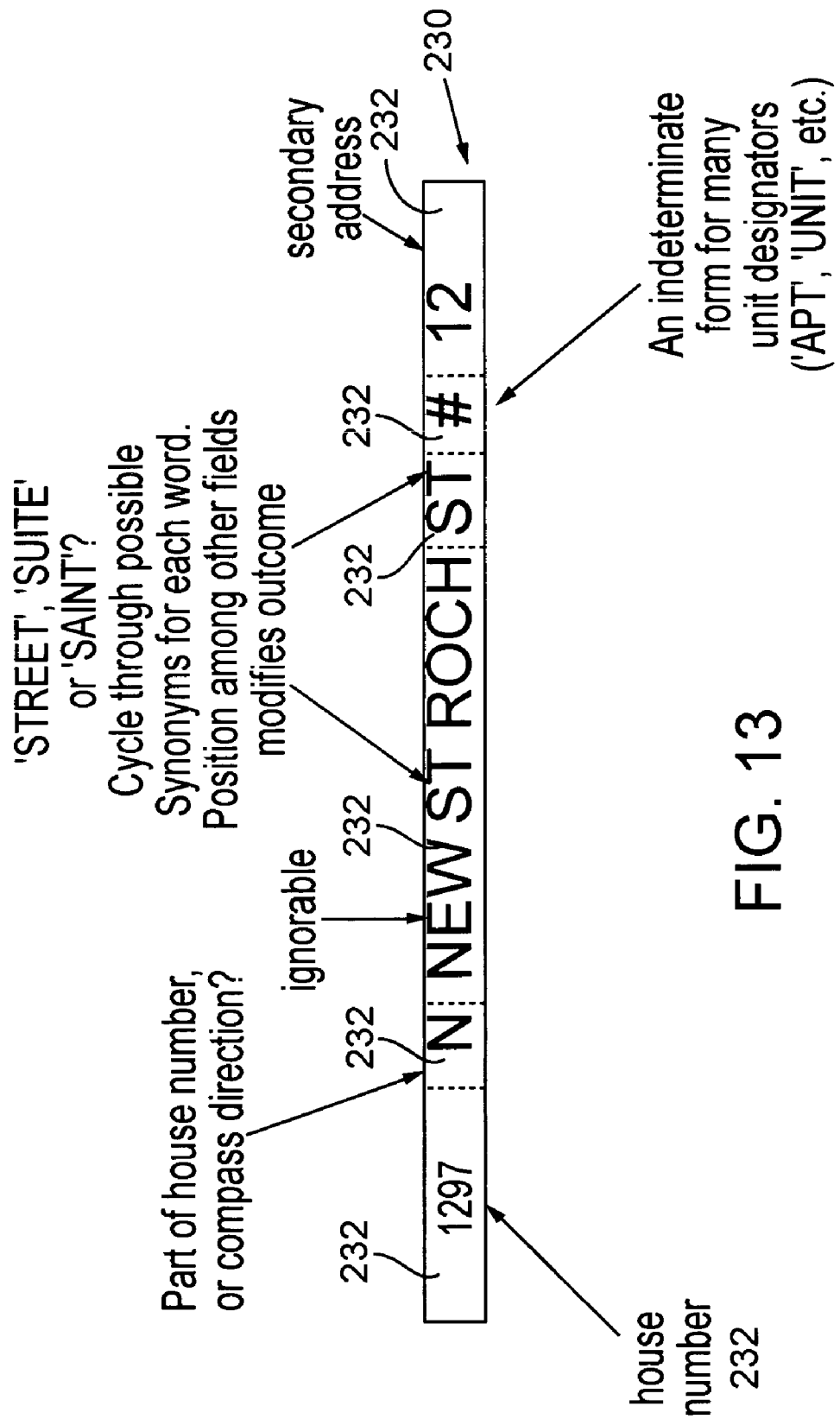
FIG. 13 depicts the process of parsing a data record into component data fields.
Figure 14:
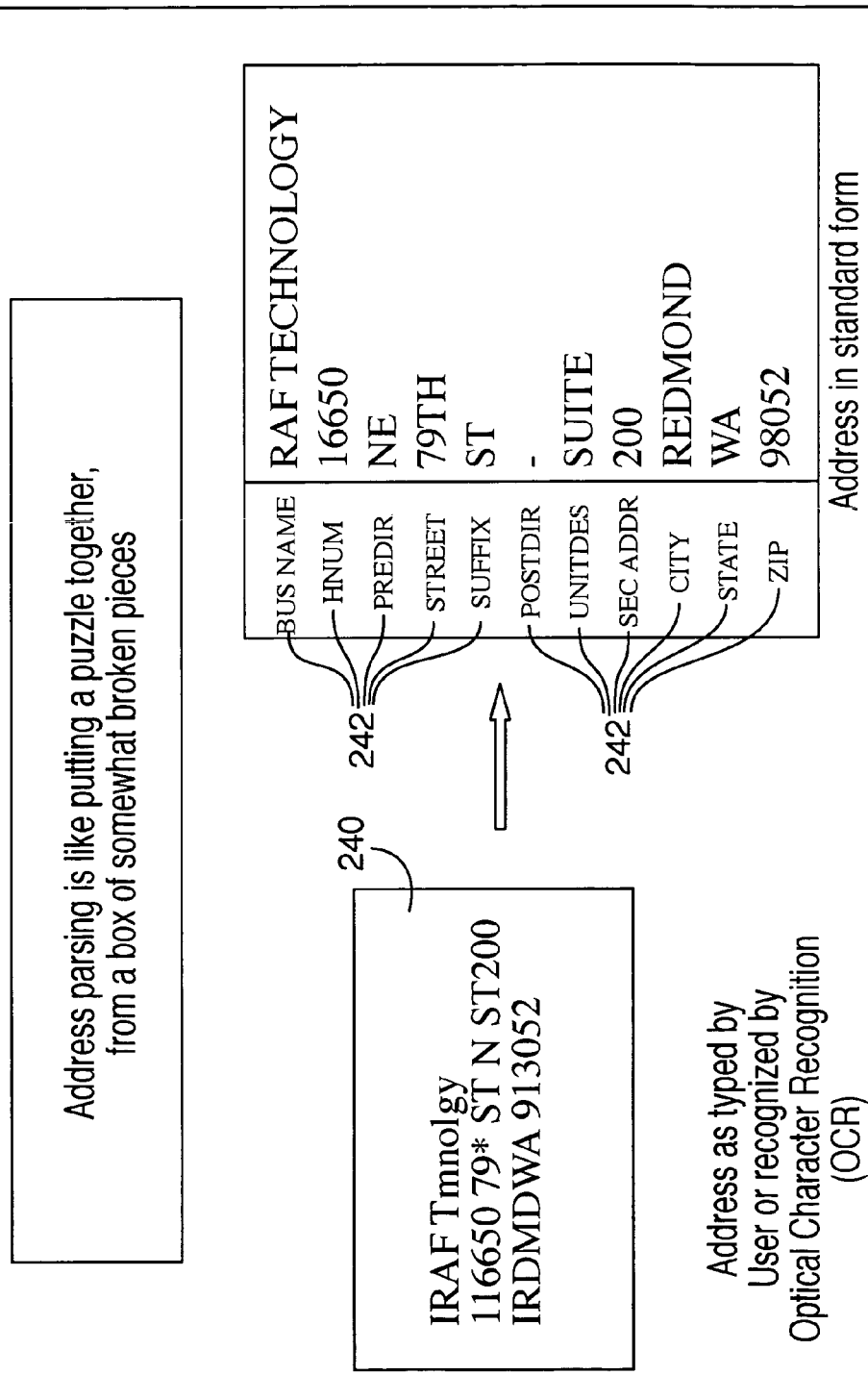
FIG. 14 depicts a data record parsed into perfected component data fields.

FIG. 13 illustrates an example of a data record corresponding to an address being parsed into individual data fields. The data record 230 can be divided into several fields 232 including house number, predirectional, street, suffix, postdirectional, unit designation, section, address, city, state, zip code, zip+4, or country. These examples of data fields are specific to postal addresses and placement of one field with respect to the other field is determined by the standardized structure of a particular country's postal system. FIG. 14 illustrates one example where a data record corresponding to an address 240 containing multiple errors can implement an embodiment of the present invention to verify and correct the individual data fields 242 that comprise the complete data record 240.

Figure 15:
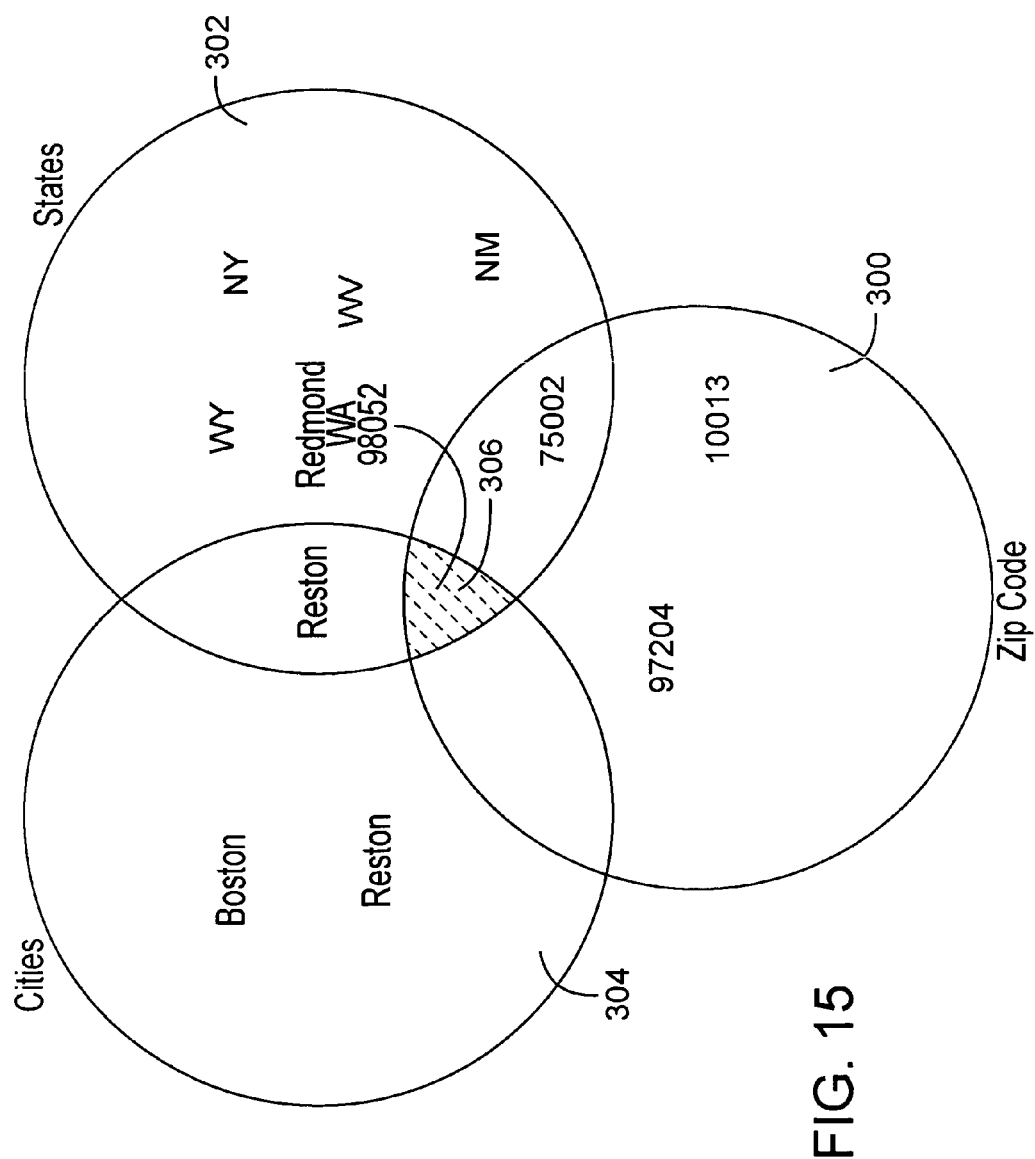
FIG. 15 depicts a Venn diagram graphically representing the use of multiple, interrelated data fields to solve a "fuzzy matching" data perfection problem.

Correcting multiple data fields is facilitated through what is known as "fuzzy matching" logic. With fuzzy matching, results are not reported as right or wrong, but rather as a probability of being correct. For example, if a zip code is illegible when scanned off of a form, it may be that one number in the zip code could be a "4" or a "9". However, if the city or state on the address are clearly recognizable, an embodiment of this invention can be used with the recognizable portions of the address to verify what the unrecognizable portions are. This process is illustrated in FIG. 15. With specific reference to FIG. 15, a crystal database may contain crystals with a table of all zip codes 300, all states 302, and all cities 304 in the United States. Although an illegible address zip code may appear to be one of multiple different numbers, by using a pointer structure such as that illustrated in FIG. 10, an embodiment of this invention can discard zip codes that do not match the obtained address's city or state. Accordingly, the zip code table 300, state table 302, and city table 304 have a common intersection 306, having information corresponding to a valid address within the country.

Figure 16:
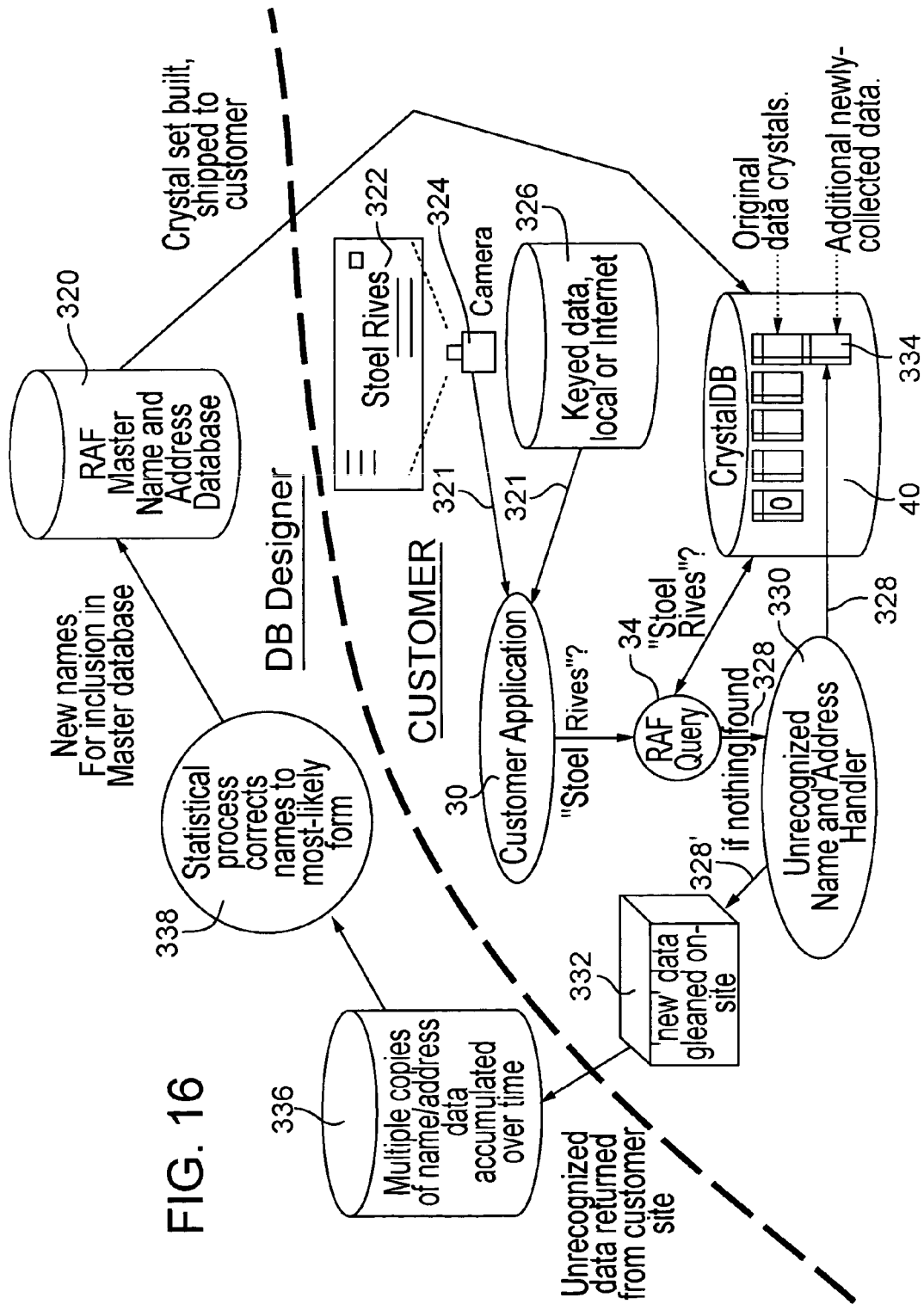
FIG. 16 schematically illustrates the process of collecting and adding data to the crystallized database.

Because an embodiment of this invention can be used as a reference to check the validity of a questionable data record, the value of the crystal database is increased if the data records used for references are periodically updated and made as complete as possible. An embodiment of the present invention has distinct advantages for updating the crystal database. FIG. 16 illustrates one example of an embodiment of the present invention being used to collect information for later addition to a crystal database. With reference to FIG. 16, a master database 320 is used by the crystal database designer to create the original crystal database 40 that is sent to the customer. The customer then receives an input stream of data 321 either from an envelope or other item being read 322 using an optical scanner or digital camera 324, or data being keyed in digitally from a keyboard or received from a network, such as the Internet, 326. The input data 321 is then supplied to the customer application 30, which calls a predefined query 34 to retrieve information from the crystal database 40. If no matches are found in the crystal database 40 for use in correcting the input data 321, the input data is classified as unrecognized data 328, which can be sent to a handler for unrecognized data 330. The handler can then store the unrecognized data 328 as an appendix 334 to the data records in the original data crystals in the crystal database 40. Alternatively, the handler 330 can store the unrecognized data 328' to a predetermined storage site 332 separate from the original data crystals. Examples of a predetermined storage site 332 could be a hard drive, floppy drive, spread sheet, data table, separate database, or entirely new data crystal dedicated for storing unrecognized data. In the case of storing data in a crystal, the iterator must be provided with the capability to obfuscate the data to be written and to update any appropriate indexes. The information can also be sent over a network or by transferring storage media to a site external to the customer. Once the information is collected in the storage site 332 it can be sent to a buffer database 336 for use by the database designer.

The information collected in the buffer database 336 can then undergo statistical analysis 338 to verify if new information was truly obtained or if the unrecognized information was simply an illegible error. When collecting data over time in the buffer database 336, multiple occurrences of an unrecognized data record statistically indicate the data is nearly correct but not present in the original reference data crystals. Once the data has undergone statistical analysis 338 to determine its correct form, it can be added to the database designer's master database 320. The new data can then be incorporated into future crystal databases that are sent to customers. If the new data is proprietary or the customer does not want to share that data with other customers of the database designer, the database designer can maintain a separate master database for each customer and only add the new data to the master database for the customer from which the data was originally obtained. Alternatively, if the new data is not very valuable or proprietary, it can be stored in clear text form, such as in a data file or spreadsheet, and directly referenced by the iterators. This process would be useful, for example, if a database customer, such as a vendor, wanted to incorporate data records such as specific customer information or pricing guidelines into the database system.

Additionally, an embodiment of the present invention can be used to collect information even if there is originally no data against which to compare the collected data. Statistical analysis could still be employed to authenticate the accuracy of data being gathered. In this manner, for example, an embodiment of this invention could be used to compile a secure database of all postal addresses in a country that has never maintained that data.

FIGS. 17A-17C illustrate three alternative methods for sending and receiving data records to and from the database customer. In FIG. 17A, the database designer 340*a* sends to the customer 342*a* a crystal database 40*a* stored on a machine readable storage medium, such as a hard drive. As the customer 342*a* obtains new data 346*a* the new data 346*a* can be stored by the customer on the machine readable storage medium. When the database designer 340*a* sends the customer 342*a* an updated database, which can be done periodically, the old crystal database 40*a* stored on the machine readable storage medium 344*a* can be returned to the designer 340*a* along with the newly collected data 346*a*. In this manner the database designer 340*a* can collect new data for addition to future databases. FIG. 17B illustrates a similar process to that illustrated in FIG. 17A, except in FIG. 17B, once the new data 346*b* is collected by the customer 342*b*, it is sent via a network 350*b*, such as the Internet, to the database designer 340*b*. Similarly, as illustrated in FIG. 17C, both the original crystal database 40*c* and the newly gathered data 346*c* can be sent over a network 350*c*, such as the Internet, either to or from the customer 342*c*.

A network can also be used to obtain data for use by the crystal database. FIGS. 18A and 18B illustrate this concept. In FIG. 18A, the crystal database 40*a* contains the individual data records 500 that are de-obfuscated and accessed by the iterator 36*a* to satisfy the predefined query 34*a* called by the customer application 30*a*. In FIG. 18B, the data records in the crystal database 40*b*, rather than containing data, contain links to external sources. For example, there can be a link to an external database 504, an external spreadsheet 502, or a link to a network 350 in order to access resources 508 stored at an external site or computer 506. Accordingly, when the customer application 30*b* calls a predefined query 34*b* to direct the iterator 36*b*, the iterator 36*b* contains instructions to access the crystal database 40*b* in order to select the appropriate link to the appropriate external source.

While this detailed description and accompanying figures have been directed primarily to examples in the context of automated data capture and perfection, the scone of the present invention is not so limited. Embodiments of this invention encompass crystalized databases regardless of the type of data record stored therein. For example, a data record can even be an object, such as a digital picture or music file. It will be obvious to those having skill in the art that many changes may be made to the details of the above-described embodiment of this invention without departing from the underlying principles thereof. The scope of the present invention should, therefore, be determined only by the following claims.

It will be obvious to those having skill in the art that many changes may be made to the details of the above-described embodiments without departing from the underlying principles of the invention. The scope of the present invention should, therefore, be determined only by the following claims.

The invention claimed is:

1. A method for building a controlled-access database for preventing unauthorized access to data records, the method comprising the steps of:

obtaining a data record;

storing the data record in a data crystal in an obfuscated format;

providing an iterator to access and deobfuscate the obfuscated data record;

providing a query to request the iterator to locate and access the data record only in accordance with a preauthorized type of data requirement; and providing a key crystal authorizing use of the data crystal and the query according to the preauthorized type of data requirement whereby the data crystal, iterator, query, and key crystal prevent unauthorized access to the data record.

2. The method of claim 1 wherein the data requirement corresponds to a data field of an address.

3. A database system regulating access to one or more data records according to authorized access rights, the database system comprising:

one or more data crystals storing one or more data records in an obfuscated format;

one or more iterators, each iterator programmed to access, deobfuscate, and return at least one of the one or more data records in response to a data request;

one or more queries, each query predefined to receive an indication of an authorized type of data requirement, to request at least one data record from the iterator, and to select from among the returned at least one data record a requested data record satisfying the data requirement; and a key crystal granting access rights for the database system whereby the one or more data crystals, one or more iterators, one or more queries, and key crystal regulate access to the one or more data records.

4. The database system of claim 3 further comprising an application to provide the indication of the data requirement to the one or more queries, wherein the application has direct access to the one or more queries but not the one or more iterators, the one or more data crystals, or the one or more data records.

5. The database system of claim 4 wherein the application selects among the one or more queries based on the type of data requirement.

6. The database system of claim 3 wherein the obfuscated format is chosen from the group consisting of: compression, encryption, XOR operations, and general bit order or bit logical manipulation.

7. The database system of claim 6 wherein the obfuscated format is compression so as to reduce memory requirements for the storing of the one or more data records.

8. The database system of claim 3, further comprising an iterator interface corresponding to a specific iterator and a corresponding data crystal; and wherein:
the iterator interface acts as a buffer between the one or more queries and the corresponding iterator; and
the iterator interface allows the queries to work with a different version of the specific iterator and corresponding data crystal.

9. The database system of claim 3, further comprising an access key for interchangeably enabling or disabling the system.

10. The database system of claim 9 wherein the access key is a hardware dongle.

11. The database system of claim 9 wherein the access key is a software component.

12. The database system of claim 3 wherein at least one data record includes a link to an external storage location.

13. The database system of claim 3 wherein at least one of the one or more data records includes unobfuscated clear text.

14. The database system of claim 3 wherein:
the one or more data records include a first data record and a second data record;
the first data record employs a first obfuscated format and the second data record employs a second obfuscated format; and the second obfuscated format is different than the first obfuscated format.

15. The database system of claim 3 further comprising a viewer to view a select data record without enabling full access to all of the one or more data records.

16. The database system of claim 3 wherein the one or more data crystals, the one or more iterators, and the one or more queries are deployed at an unsecured customer location.

17. The database system of claim 3 wherein each iterator corresponds to only one of the one or more data crystals.

18. The database system of claim 3 wherein a first query can call a second query to employ at least one of the one or more iterators.

19. The database system of claim 3 wherein the data requirement corresponds to a data field of an address.

20. The database system of claim 3 wherein the access rights include query permissions to determine which of the one or more queries are accessible.

21. The database system of claim 3 wherein the access rights include crystal permissions to determine which of the one or more data crystals are accessible.

22. A controlled access database system comprising:
a plurality of data crystals, each data crystal containing at least one data record employing an obfuscation technique;
an iterator programmed to access the at least one data record according to the obfuscation technique;
at least one query of a predefined type:
wherein one or more of the at least one query is called by an application with a data requirement;
wherein the data requirement of the application determines the one or more called query; and
wherein the one or more called query employs the iterator to access the at least one data record; and
a key crystal granting access rights to the database system whereby the plurality of data crystals, iterator, at least one query, and key crystal control access to the at least one data record.

23. The database system of claim 22 wherein the key crystal authorizes access to a specific data crystal out of the plurality of data crystals, wherein the specific data crystal is authorized for the application.

24. The database system of claim 22 wherein the key crystal authorizes access to a specific query out of the at least one query, wherein the specific query is authorized for the application.

25. The database system of claim 22 wherein a first query can call a second query to employ the iterator.

* * * * *